United States Patent
Hayashi et al.

(10) Patent No.: US 8,771,069 B2
(45) Date of Patent: *Jul. 8, 2014

(54) GAME MACHINE, A STORAGE MEDIUM STORING A COMPUTER PROGRAM USED THEREOF, AND CONTROL METHOD

(75) Inventors: Kazuha Hayashi, Minato-ku (JP); Yoshitaka Nishimura, Minato-ku (JP); Tetsuhiro Honjo, Minato-ku (JP); Aoi Tagami, Minato-ku (JP); Takayuki Ishikawa, Minato-ku (JP); Hidenori Kotera, Minato-ku (JP); Yuki Sato, Minato-ku (JP); Yuma Miyazaki, Minato-ku (JP); Eriko Motohashi, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/813,729

(22) PCT Filed: Jul. 6, 2012

(86) PCT No.: PCT/JP2012/067393
§ 371 (c)(1),
(2), (4) Date: Feb. 1, 2013

(87) PCT Pub. No.: WO2013/008760
PCT Pub. Date: Jan. 17, 2013

(65) Prior Publication Data
US 2013/0130795 A1    May 23, 2013

(30) Foreign Application Priority Data
Jul. 8, 2011    (JP) .................................. 2011-152362

(51) Int. Cl.
*A63F 9/24*    (2006.01)

(52) U.S. Cl.
USPC ....................... 463/31; 463/7; 463/35; 463/37

(58) Field of Classification Search
USPC .......................... 463/7, 35–38; 345/156–157; 84/609–610
See application file for complete search history.

(56) References Cited

U.S. PATENT DOCUMENTS 7,331,856 B1 *  2/2008  Nakamura et al. ................. 463/7
8,153,881 B2 *  4/2012  Coppard et al. ................. 84/615

(Continued)

FOREIGN PATENT DOCUMENTS

EP    0 993 847 A1    4/2000
JP    2000-116938 A    4/2000

(Continued)

OTHER PUBLICATIONS

International Search Report (Date of Mailing Oct. 2, 2012).

(Continued)

*Primary Examiner* — William Brewster
*Assistant Examiner* — Alex F. R. P. Rada, II
(74) *Attorney, Agent, or Firm* — Howard & Howard Attorneys PLLC

(57) ABSTRACT

A game machine includes: a monitor (2) that displays and outputs a game screen (40R); a control panel (3) that includes volume controllers (9) operated so as to change a position of an outer circumferential portion (SP) of a knob portion (9T); a external storage device (20) that stores sequence data (30) in which a reference timing at which the volume controllers (9) are operated during a game is associated with a reference position at which the outer circumferential portion (SP) is to be positioned at the reference timing. And, the game machine teaches information of the reference timing and the reference position to a player, based on the sequence data (30).

16 Claims, 16 Drawing Sheets

(56) References Cited

U.S. PATENT DOCUMENTS

| | | |
|---|---|---|
| 2010/0035685 A1 | 2/2010 | Cha |
| 2010/0056281 A1 | 3/2010 | Uchiyama |
| 2010/0216547 A1* | 8/2010 | Coppard et al. ................ 463/31 |
| 2010/0261536 A1 | 10/2010 | Shibamiya et al. |
| 2011/0077077 A1 | 3/2011 | Tsubakisawa et al. |
| 2013/0053114 A1* | 2/2013 | Nishimura et al. ............... 463/7 |

FOREIGN PATENT DOCUMENTS

| | | |
|---|---|---|
| JP | 2001-096061 A | 4/2001 |
| JP | 2001-321564 A | 11/2001 |
| JP | 2010-36038 A | 2/2010 |
| JP | 2011-67528 A | 4/2011 |
| JP | 2011-189073 A | 9/2011 |
| KR | 10-2009-0076986 | 7/2009 |
| KR | 10-2010-0087771 | 8/2010 |

OTHER PUBLICATIONS

Japanese Office Action with English Translation (Dated Oct. 2, 2012).

Korean Intellectual Property Office Notice of Preliminary Rejection; Apr. 21, 2014 (7 pages).

* cited by examiner

GAME MACHINE, A STORAGE MEDIUM STORING A COMPUTER PROGRAM USED THEREOF, AND CONTROL METHOD

CROSS REFERENCE TO RELATED APPLICATION

This application is a national stage application of PCT/JP2012/067393, filed Jul. 6, 2012, which claims priority to Japanese Patent Application No. 2011-152362, filed Jul. 8, 2011, the disclosures of which are hereby incorporated by reference in their entirety.

TECHNICAL FIELD

The present invention relates to a game machine, a storage medium storing a computer program used thereof, and a control method.

BACKGROUND ART

A music game has been known in which a note bar corresponding to a rhythm sound is displayed along a predetermined path, and an operation timing is taught by moving the note bar toward a reference line so that the note bar can match the reference line corresponding to the current time at the operation timing (for example, see Patent Literature 1).
Patent Literature 1: JP 2001-96061 A.

SUMMARY OF INVENTION

Technical Problem

In the game machine disclosed in Patent Literature 1, the operation timing is taught such that the note bar matches the reference line. Further, the taught operation timing is compared with an actual operation timing on a simulated guitar used as an operation device, and the actual operation timing is evaluated. However, it is difficult to teach a plurality of pieces of information such as concrete operation content and the like by only one change, that is, a reduction in a distance between the note bar and the reference line. For this reason, in the game machine disclosed in Patent Literature 1, a concrete operation such as an operation amount or an operation direction of the operating unit is not requested. In this case, since an operation that the player is requested to perform is limited, there is a limitation to a game variation which can be actualized. Thus, amusement of a game can be further improved.

In this regard, it is an object of the present invention to provide a game machine capable of requesting the player to perform a concrete operation, a storage medium storing a computer program used thereof, and a control method.

Solution to Problem

A game machine according to the present invention comprises: a display apparatus that displays and outputs a game screen; an input apparatus that includes at least one operating unit operated so as to change a position of a reference portion; a reference timing data storage device adapted and configured to store reference timing data in which a reference timing at which the operating unit is operated during a game is associated with information related to a reference position at which the reference portion is to be positioned at the reference timing; and an operation teach device adapted and configured to guide a player about the reference timing and the information of the reference position based on the reference timing data.

According to the present invention, both the reference timing and the information of the reference position are taught to the player based on the reference timing data. For this reason, it is possible to request the player to perform a concrete operation on the operating unit such as an operation to cause the reference portion to be arranged at the reference position at the reference timing. Thus, since a variation of a game can be increased, amusement of a game can be improved.

The reference timing and the reference position may be taught in various ways. For example, in an aspect of the game machine according to the present invention, the operation teach device may comprises: a reference timing determining device adapted and configured to determine the reference timing included within a predetermined time range from a current time on the game to a future and the information of the reference position corresponding to the reference timing based on the reference timing data; and a mark control device adapted and configured to cause a reference mark representing each reference timing and the information of the reference positions corresponding to each reference timing determined by the reference timing determining device, and a current time mark corresponding to the current time, to be displayed along a time axis on the game by an arrangement of a time order, and cause relative displacement along the time axis between the reference mark and the current time mark such that a distance in a time axis direction between the reference mark and the current time mark changes with a decrease in a time difference between the reference timing to be taught by the reference mark and the current time. In this case, for example, it is possible to match the current time mark with the reference mark at the current time through a change such as a decrease in a distance in a time axis direction between the reference mark and the current time mark with a decrease in a time difference between the reference timing to be taught by the reference mark and the current time. Thus, it is possible to teach the reference timing and the reference position corresponding to the reference timing through relative displacement between reference mark and the current time mark along the time axis.

In the aspect of the present invention in which the reference mark is displayed, information related to a position in a second direction crossing a first direction going along the time axis direction may be described in the reference timing data as the information related to the reference position, and the mark control device may teach information related to the position in the second direction by displaying the reference mark at the position in the second direction corresponding to the reference timing at the reference timing on the time axis based on the information related to the position in the second direction. In this case, it is possible to teach information of the position in the second direction to the player using a positional deviation of the reference mark related to the position in the second direction. Further, the player can easily recognize a correspondence relation between the reference timing and the information of the position in the second direction at the reference timing.

In the aspect in which the information related to the position in the second direction is described as the information related to the reference position, various marks may be used as the reference mark. For example, in an aspect of the game machine according to the present invention, the mark control device may display an instruction path extending from one end side of the time axis toward the other end side while passing through each position in the second direction corresponding to each reference timing in a time order of each reference timing determined by the reference timing determining device as the reference mark. In this case, the position in the second direction can be continuously taught using the instruction path. Thus, it is possible to continuously request the player to perform a concrete operation.

Further, in the aspect in which the information related to the position in the second direction is described as the information related to the reference position, the mark control device may further display an operation corresponding mark in which the position in the second direction changes according to a change in the position of the reference portion while matching the current time mark in the first direction at the current time. In this case, it is possible to teach an actual operation result on the operating unit through the operation corresponding mark. Thus, the player can be induced to perform a more appropriate operation.

Furthermore, any direction may be used as the second direction as long as the direction crosses the first direction. For example, in an aspect of the game machine according to the present invention, an orthogonal direction among directions crossing the first direction may be used as the second direction.

The information related to the reference timing may be described in the reference timing data in various ways. For example, in an aspect of the game machine according to the present invention, information related to the change direction and the amount of change of the reference portion may be described in the reference timing data as the information related to the reference position.

The number of operating units provided in the input apparatus is not limited to one. For example, in an aspect of the game machine according to the present invention, a plurality of operating units may be provided in the input apparatus, the reference timing may be described in the reference timing data further in association with information designating any one of the plurality of operating units, and the operation teach device may teach the reference timing corresponding to each of the plurality of operating units and the information of the reference position to be distinguishable for each operating unit. Alternatively, in the aspect in which the instruction path is used as the reference mark, a plurality of operating units may be provided in the input apparatus, the reference timing may be described in the reference timing data further in association with information designating any one of the plurality of operating units, and the mark control device may display the instruction path corresponding to each of the plurality of operating units to be distinguishable for each operating unit.

The instruction path may be displayed in various ways as long as the instruction path can be distinguishable for each operating unit. For example, in an aspect of the game machine according to the present invention, the mark control device may display the instruction path corresponding to each of the plurality of operating units to be distinguishable for each operating unit by arranging at least one of the one end side and the other end side of the instruction path at a different position for each operating unit. Alternatively, the mark control device may display the instruction path corresponding to each of the plurality of operating units to be distinguishable by causing a color of the instruction path to differ according to the operating unit.

The relative displacement between the reference mark and the current time mark may be caused in various ways. For example, in an aspect of the game machine according to the present invention, the operation teach device may cause the relative displacement along the time axis such that the reference mark moves toward the current time mark.

In an aspect of the game machine according to the present invention, the input apparatus may be configured to detect an operation on the operating unit, and the operation teach device may comprise an evaluating unit adapted and configured to evaluate an operation on the operating unit based on the reference timing and the information of the reference position described in the reference timing data. In this case, since the operation on the operating unit is evaluated, it is possible to induce the player to perform an appropriate operation at the reference timing.

In an embodiment of the game machine of the present invention, the game machine may further comprise: an audio output apparatus that reproduces and outputs a sound; a song data storage device adapted and configured to store song data to reproduce a song; and a song reproducing device adapted and configured to reproduce the song through the audio output apparatus based on the song data, and wherein a timing during reproduction of the song may be described in the reference timing data as the reference timing. In this case, the music game in which the reference timing and information of the reference position are taught can be actualized.

The input apparatus may be provided with various operating units. For example, in an aspect of the game machine according to the present invention, the input apparatus may be provided with a rotational operating member that has a center line and is configured to rotate on the center line as the operating unit, wherein a position of an outer circumferential portion changes with the rotation, and the outer circumferential portion of the rotational operating member may be used as the reference portion. In this aspect, the rotational operating member may be provided with a distinguishing device for distinguishing a portion of the outer circumferential portion from the remaining portion, and the portion of the outer circumferential portion distinguished by the distinguishing device may be used as the reference portion. In this case, since the outer circumferential portion is provided with the portion distinguished from the remaining portion, it is possible to cause the player to use this portion as the reference of the position.

A storage medium storing a computer program for a game machine is a storage medium storing a computer program for a game machine comprising: a display apparatus that displays and outputs a game screen; an input apparatus that includes at least one operating unit operated so as to change a position of a reference portion; a reference timing data storage device adapted and configured to store reference timing data in which a reference timing at which the operating unit is operated during a game is associated with information related to a reference position at which the reference portion is to be positioned at the reference timing; and wherein the computer program is configured so as to cause a computer which is incorporated in the game machine to serve as: an operation teach device adapted and configured to teach a player about the reference timing and the information of the reference position based on the reference timing data.

A control method of a game machine is a control method of controlling a computer incorporated in a game machine comprising: a display apparatus that displays and outputs a game screen; an input apparatus that includes at least one operating unit operated so as to change a position of a reference portion; a reference timing data storage device adapted and configured to store reference timing data in which a reference timing at which the operating unit is operated during a game is associated with information related to a reference position at which the reference portion is to be positioned at the reference timing, and wherein the control method of controlling the computer comprises an operation teach step that teaches a player about the reference timing and the information of the reference position based on the reference timing data. By executing the control method or the computer program of the present invention, it is possible to realize the game system of the present invention.

Advantageous Effects of Invention

As described above, according to the present invention, both the reference timing and the information of the reference position can be taught to the player based on the reference timing data. Thus, it is possible to request the player to perform a concrete operation on the operating unit such as an operation to arrange reference portion on the reference position at the reference timing.

DESCRIPTION OF EMBODIMENTS

Figure 1:
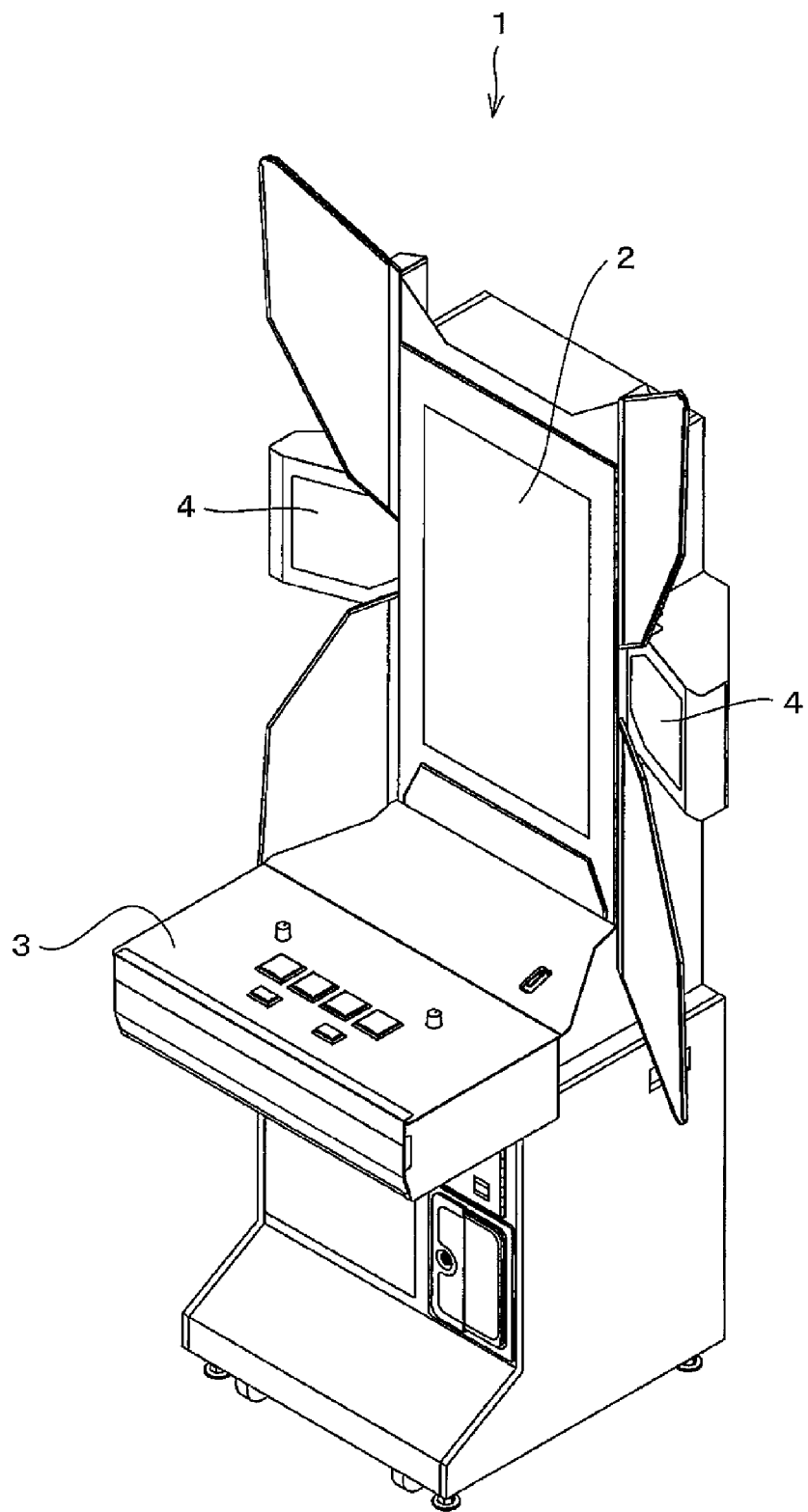
FIG. 1 is a diagram illustrating an external appearance of a game machine according to an embodiment of the present invention.
Figure 2:
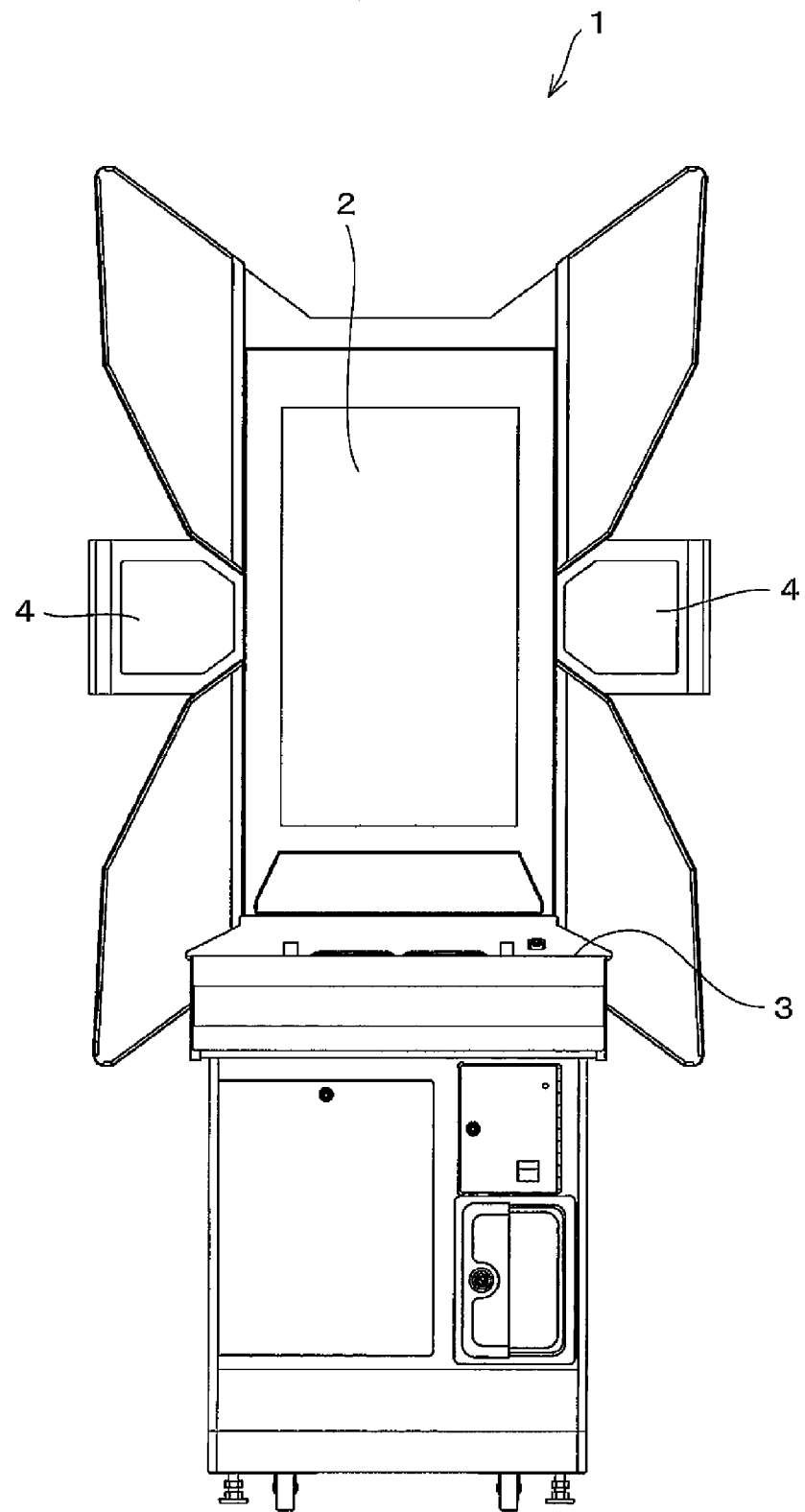
FIG. 2 is a front view of the game machine illustrated in FIG. 1.
Figure 3:
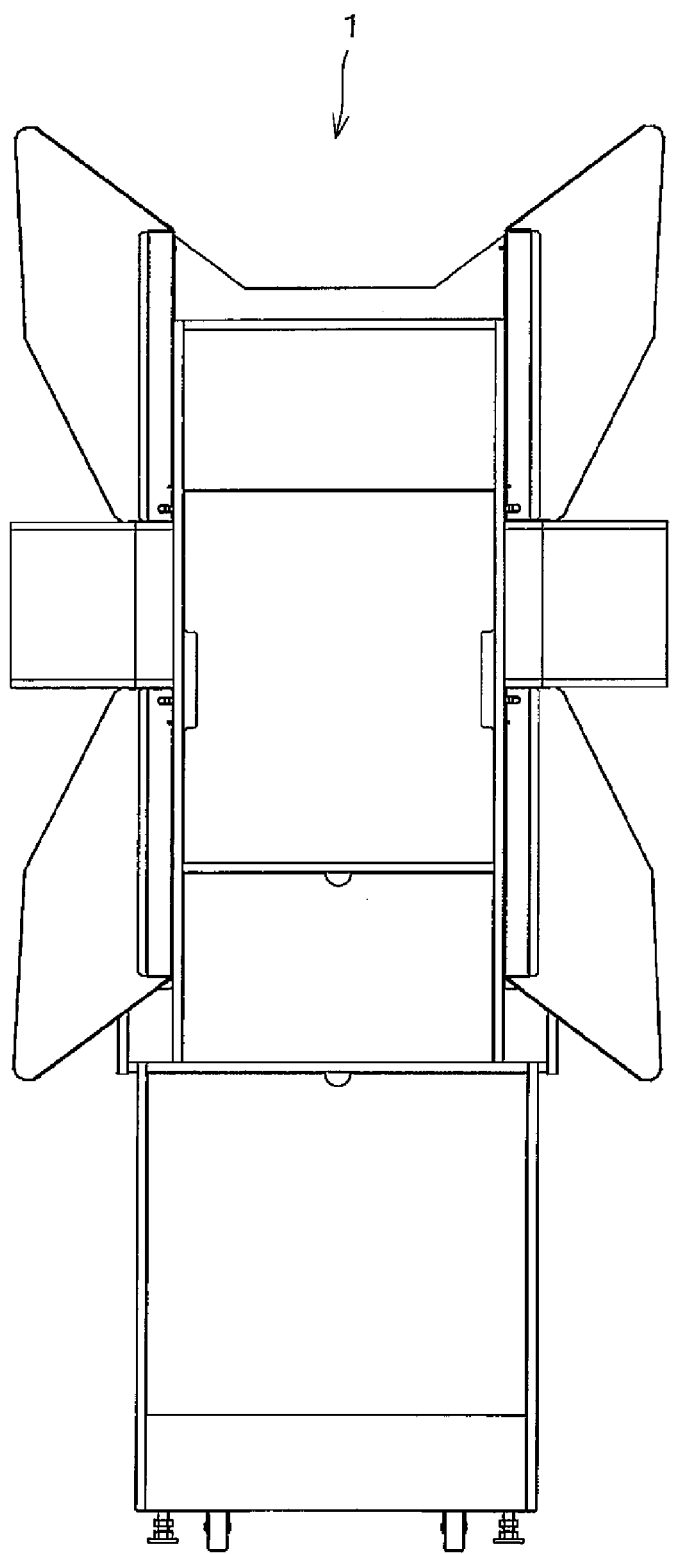
FIG. 3 is a back view of the game machine illustrated in FIG. 1.
Figure 4:
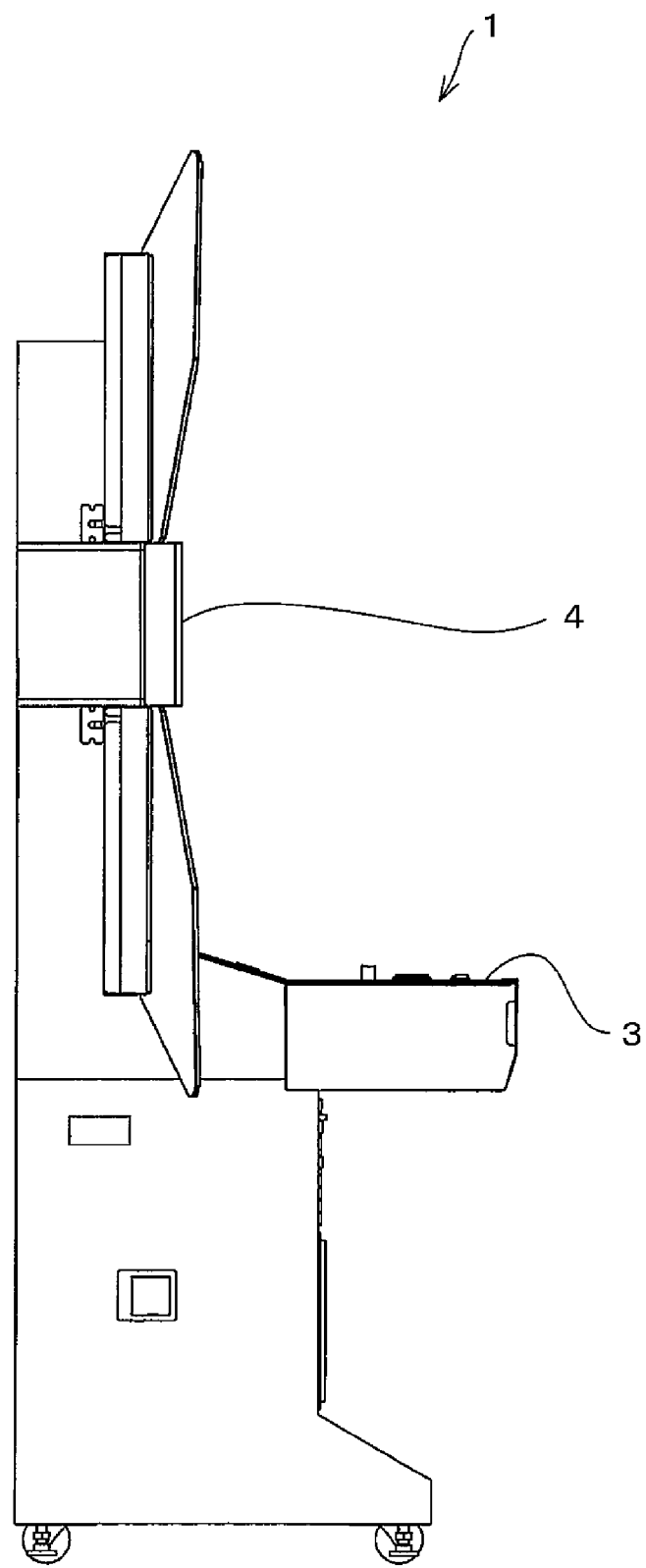
FIG. 4 is a side view of the game machine illustrated in FIG. 1.
Figure 5:
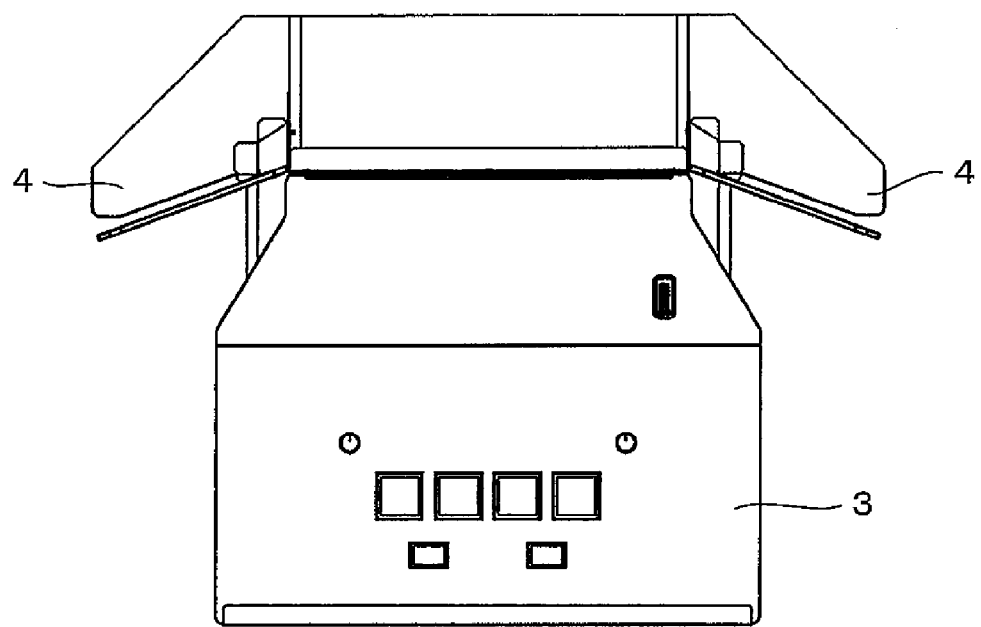
FIG. 5 is a plane view illustrating the game machine of FIG. 1 viewed from the top.

Hereinafter, a game machine according to an embodiment of the present invention will be described. FIG. 1 is a diagram illustrating an external appearance of a game machine according to an embodiment of the present invention. FIG. 2 is a front view, FIG. 3 is a back view, FIG. 4 is a side view, and FIG. 5 is a plane view. As illustrated in these drawings, a game machine 1 includes a monitor 2 serving as a display apparatus, a control panel 3 serving as an input apparatus, and two speakers 4 serving as an audio output apparatus. Each speaker 4 is configured to emit a light and changes a color of emitted light during play. Note that, the game machine 1 includes various input apparatuses and output apparatuses, provided in a typical game machine for business use, such as a volume operating switch, a power switch, and a power lamp in addition to the control panel 3. However, the input apparatuses and output apparatuses are not illustrated in FIGS. 1 to 5. Further, a plurality of game machines 1 may be arranged in a row and used.

Figure 6:
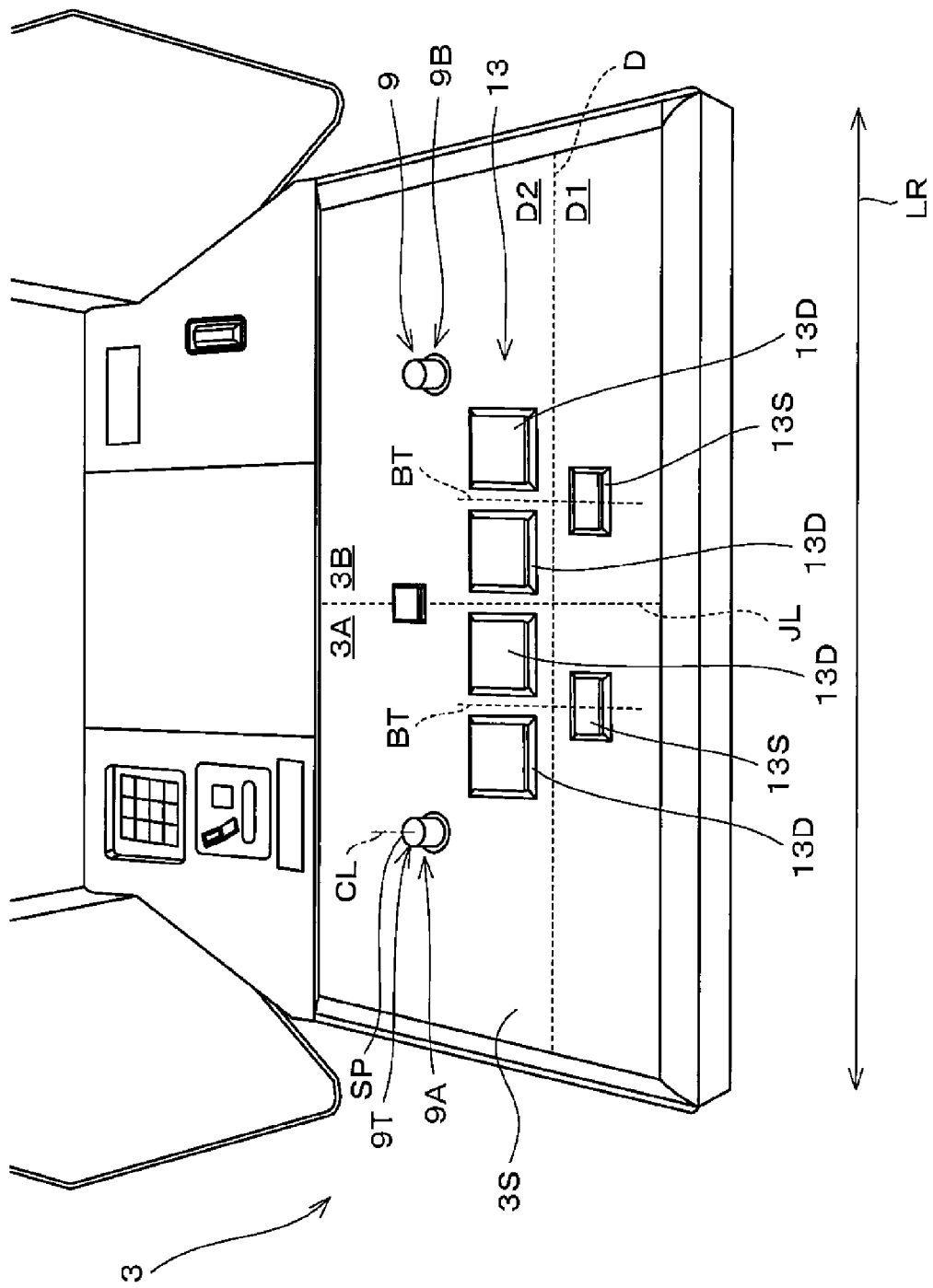
FIG. 6 is an enlarged view of a control panel illustrated in FIG. 1.

FIG. 6 is an enlarged view of the control panel 3 illustrated in FIG. 1. As illustrated in FIG. 6, the control panel 3 includes two volume controllers 9 serving as an operating unit and a rotational operating member, and six buttons 13. The six buttons 13 are classified into four large buttons 13D and two small buttons 13S smaller than the large buttons 13D. Further, a surface 3S is divided into a first area D1 and a second area D2. A dotted line D illustrated in FIG. 6 represents the boundary between the first area D1 and the second area D2. As illustrated in FIG. 6, the four large buttons 13D are arranged on the first area D1 above the two small buttons 13S, and the two small buttons are arranged on the second area D2 below the first area D1. Further, the four large buttons 13D are arranged so as to form a line in a horizontal direction. Meanwhile, the two small buttons 13S are also arranged so as to form a line in the horizontal direction.

Furthermore, the six buttons 13 are arranged at vertically symmetrical positions with reference to a longitudinal line JL that divides the surface 3S of the control panel 3 in two in a left-right direction LR. The longitudinal line JL vertically divides the first area D1 and the second area D2 in half. In other words, the control panel 3 is divided into a left area 3A and a right area 3B by the longitudinal line JL, and the three buttons 13 are arranged on each of the areas 3A and 3B. And, the three buttons 13 included in the left area 3A and the three buttons 13 included in the right area 3B are arranged so as to be vertically symmetrical to each other with reference to the longitudinal line JL. Further, each of the small buttons 13S is arranged on an intermediate line BT, which is defined midway between the two large buttons 13D included in each of the areas 3A and 3B, in the left-right direction LR. As described above, a predetermined positional relation is formed between one small button and the two large buttons 13D included in each of the left and right areas 3A and 3B. Note that, the dotted lines such as the longitudinal line JL and the intermediate line BT illustrated in FIG. 6 are imaginary lines, and are not formed in the actual control panel 3.

The volume controller 9 is arranged on the second area D2. Further, the two volume controllers 9 are also classified into a left volume controller 9A included in the left area 3A and a right volume controller 9B included in the right area 3B by the longitudinal line JL. The volume controllers 9A and 9B are also arranged to be vertically symmetrical to each other with reference to the longitudinal line JL. Further, the volume controller 9 has a cylindrical shape having a center line CL. The volume controller 9 includes a shaft portion (not illustrated) that extends in a direction intersecting with the surface 3S along the center line CL and a knob portion 9T fixedly attached to the shaft portion. The shaft portion is provided so as to rotate around the center line CL in both left and right directions. In other words, the volume controller 9 is configured so as to rotate around the center line CL both counter-clockwise and clockwise. The volume controller 9 is operated rotationally in both left and right directions by the player through the knob portion 9T. Further, the position of an outer circumferential portion SP of the knob portion 9T changes with the rotational operation. Thus, the outer circumferential portion SP of the knob portion 9T functions as a reference portion of the present invention.

Figure 7:
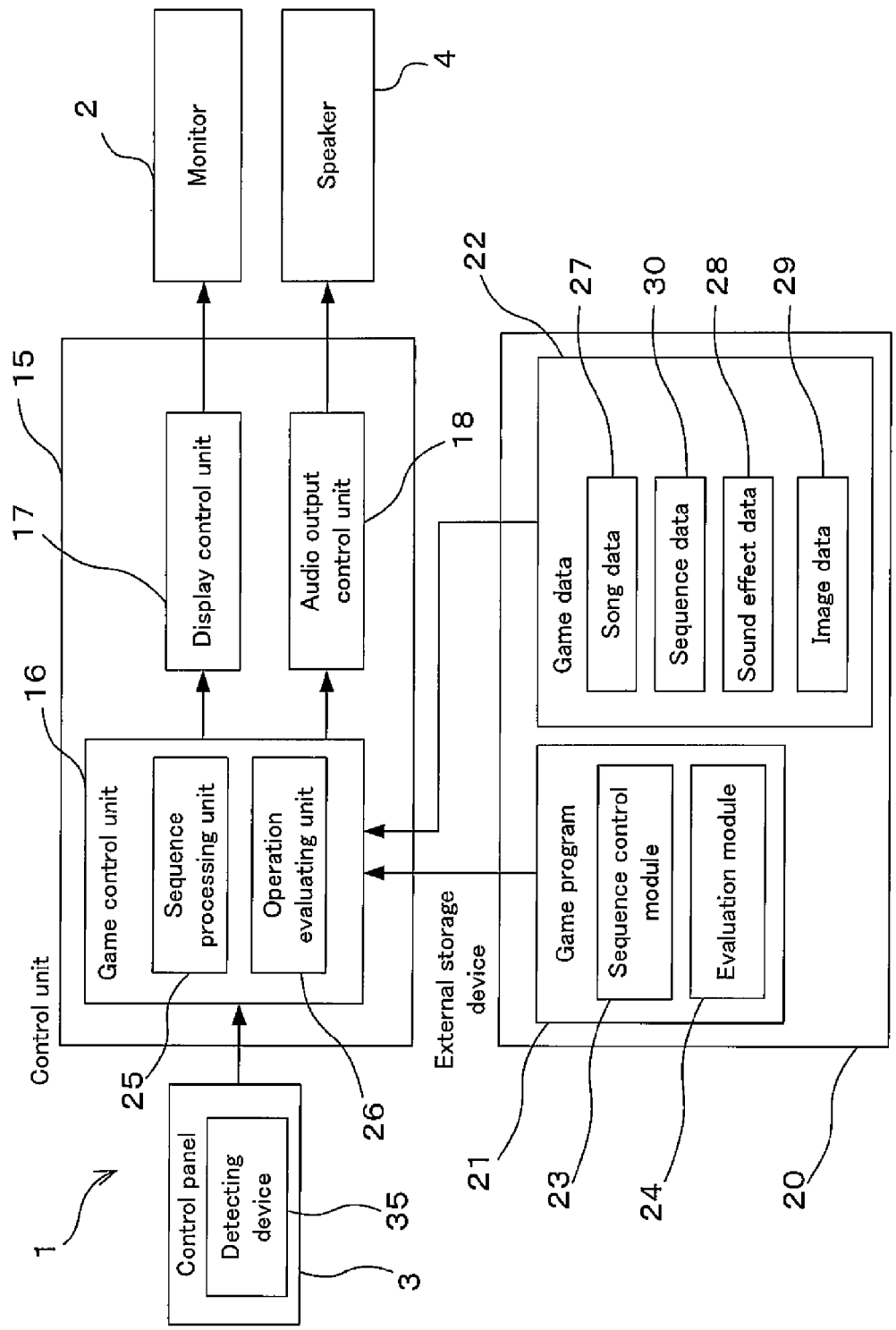
FIG. 7 is a functional block diagram of a game machine.

FIG. 7 is a functional block diagram of the game machine 1. As illustrated in FIG. 7, a control unit 15 as a computer is provided in the game machine 1. Further, the control panel 3, the monitor 2, and the speaker 4 are connected with the control unit 15. The control unit 15 includes a game control unit 16 serving as a main control entity, a display control unit 17 that operates according to an output from the game control unit 16, and an audio output control unit 18. The game control unit 16 is configured as a unit in which a microprocessor is combined with various peripheral devices such as internal storage devices (for example, a random access memory (RAM) and a read only memory (ROM)) necessary for an operation of the microprocessor.

The display control unit 17 performs rendering an image corresponding to image data given from the game control unit 16 in a frame buffer, and outputs a video signal corresponding to the image which has been subjected to rendering to the monitor 2, so that a predetermined image is displayed on the monitor 2. The audio output control unit 18 generates an audio reproduction signal corresponding to audio reproduction data given from the game control unit 16, and outputs the audio reproduction signal to the speaker 4, so that a predetermined sound (including a song or the like) is reproduced through the speaker 4.

Further, the game control unit 16 is connected to an external storage device 20. As the external storage device 20, there is used a storage medium that maintains data even though power is not supplied, such as an optical storage medium including a digital versatile disc read only memory (DVD-ROM) or a compact disk read only memory (CD-ROM), and a non-volatile semiconductor memory including an electrically erasable programmable read only memory (EEPROM).

The external storage device 20 stores a game program 21 and game data 22. The game program 21 is a computer program necessary to execute a music game according to a predetermined process by the game machine 1. The game program 21 includes a sequence control module 23 for actualizing a function related to the present invention, and an evaluation module 24. When the game machine 1 starts up, the game control unit 16 executes an operation program stored in an internal storage device thereof, and executes various processes necessary to operate as the game machine 1.

Subsequently, the game control unit 16 sets an environment for executing a music game according to the game program 21. As the sequence control module 23 of the game program 21 is executed by the game control unit 16, a sequence processing unit 25 is generated in the game control unit 16. Further, as the evaluation module 24 of the game program 21 is executed by the game control unit 16, an operation evaluating unit 26 is generated in the game control unit 16. The sequence processing unit 25 and the operation evaluating unit 26 are logical devices actualized by a combination of computer hardware and a computer program.

The sequence processing unit 25 executes a music game process including the processes such as a process of instructing the player to perform an operation in time with reproduction of music (song) selected by the player, or a process of generating a rendering effect such as a sound effect in response to the player's operation. The operation evaluating unit 26 executes a process of evaluating the player's operation. Note that, the game program 21 includes various program modules necessary to execute a music game in addition to the above-described modules 23 and 24, and logical devices corresponding to the modules are generated in the game control unit 16. However, the program modules and the logical devices are not illustrated in the drawings.

Figure 8:
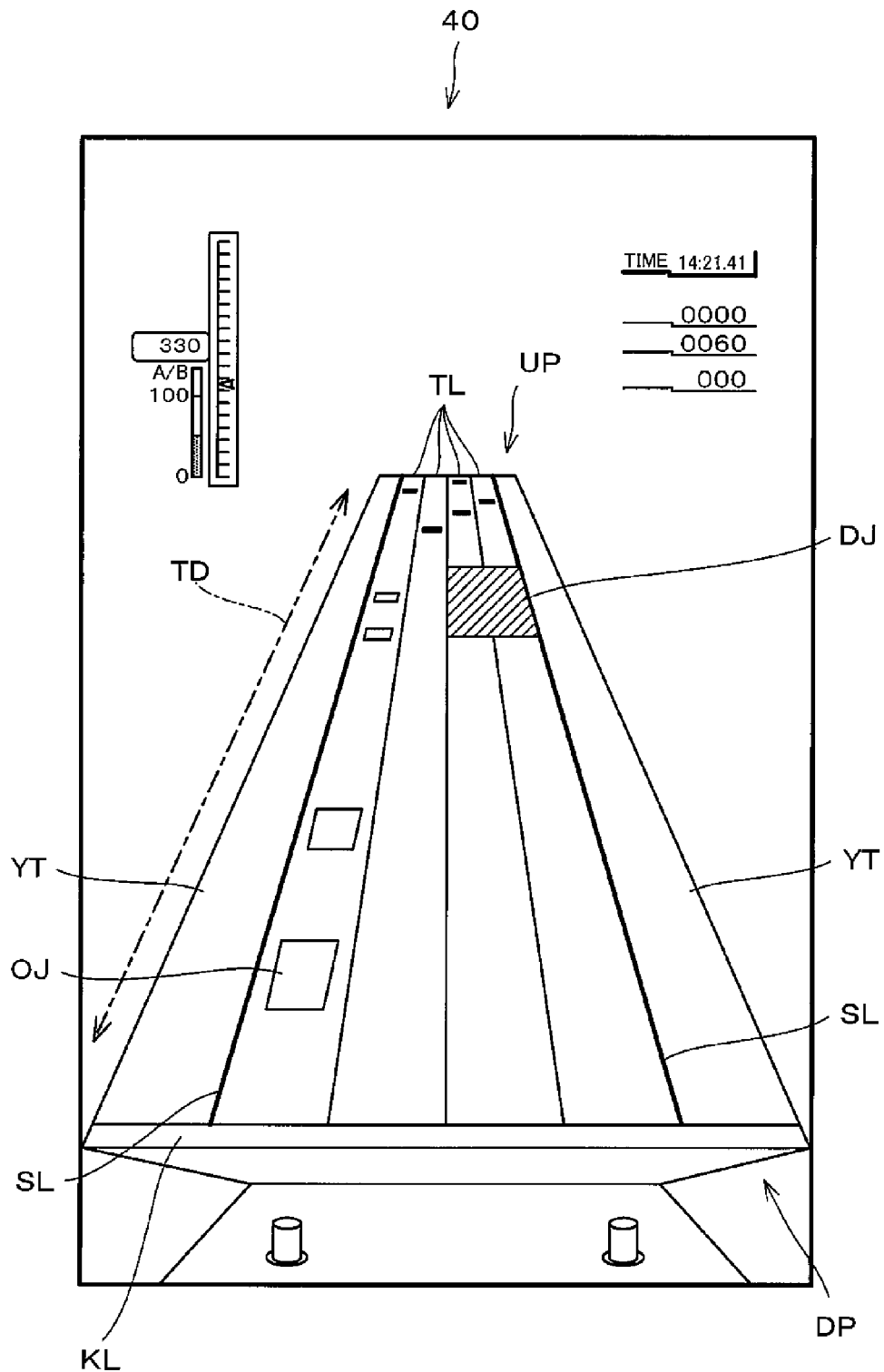
FIG. 8 is a diagram schematically illustrating an example of a game screen.

The game data 22 includes a variety of data which is referred to when a music game is executed according to the game program 21. For example, the game data 22 includes song data 27, sound effect data 28, and image data 29. The song data 27 is data necessary to reproduce a song which is a target of a game through the speaker 4. FIG. 8 illustrates a single kind of song data 27, but the player can actually select a song to play from among a plurality of songs. In the game data 22, a plurality of song data 27 which correspond to plural kinds of songs, respectively, are recorded with information identifying a song. The external storage device 20 functions as a song data storage device by storing the song data 27.

The sound effect data 28 is data in which each of plural kinds of sound effects to be output from the speaker 4 in response to the player's operation is recorded in association with a unique code for each sound effect. The sound effect includes various kinds of sounds other than a song. As the sound effect data 28, sound effect data which correspond in number to a predetermined number of octaves may be prepared by changing a musical pitch for each kind. The image data 29 is data for causing a background image of a game screen, various objects, icons, and the like to be displayed on the monitor 2.

The game data 22 further includes sequence data 30 serving as reference timing data. The sequence data 30 is data in which an operation to be instructed to the player is defined. At least one piece of sequence data 30 is prepared for the song data 27 of one song. The details of the sequence data 30 will be described below. Further, the external storage device 20 functions as a reference timing data storage device by storing the sequence data 30.

The control panel 3 includes a detecting device 35 therein. The detecting device 35 detects an operation on the button 13 or an operation on the volume controller 9. Specifically, the detecting device 35 detects a rotation amount and a rotation direction of the volume controller 9 (or the position of the portion used as a reference in a circumferential direction) or the presence or absence of an operation of pushing the button 13. A detection result of the detecting device 35 is output to the game control unit 16 and then used for various processes executed by the game control unit 16. Note that, a well-known technique may be used as the detecting device 35. Further, two detecting devices 35 may be provided for the volume controller 9 and for the button 13, respectively, and eight detecting devices 35 may be disposed for the six buttons 13 and for the two volume controllers 9, respectively.

Next, the outline of a music game executed by the game machine 1 will be described. In the game machine 1, a music game in which an appropriate operation corresponding to a reproduced song is evaluated is executed. A concrete description will be made with reference to FIGS. 8 to 11. FIG. 8 is a diagram schematically illustrating an example of a game screen. As illustrated in FIG. 8, a game screen 40 includes four tracks TL. The four tracks TL extend from a back side (the upper side) UP serving as one side of the screen toward a front side (a lower side) DP serving as the other end side so as to render a virtual three-dimensional (3D) space. Similarly, the four tracks TL are arranged between two separator lines SL extending from the back side UP of the screen toward the front side DP. A depth direction TD in which the track TL extends is used as a time axis direction (a first direction). Further, the four tracks TL correspond to the four large buttons 13D, respectively. Furthermore, two spare tracks YT extending from the back side UP of the screen toward the front side DP are arranged at the side of each of the two separator lines SL.

A reference line KL serving as a current time mark is arranged at the lower side (the front side) of the game screen 40. The reference line KL extends in the form of a straight line so as to cross the four tracks TL in a left-right direction (a second direction). Further, an object OJ is displayed on each track TL at an appropriate timing. Further, a large object DJ is similarly displayed at an appropriate timing. The large object DJ is arranged to straddle two left tracks or two right tracks among the four tracks TL. The object OJ and the large object DJ move from the back side UP of the track TL toward the front side DP. The player is required to execute an appropriate operation in time with arrival of the object OJ and the large object DJ at the reference line KL. Specifically, the player is required to execute an operation of pushing the large button 13D corresponding to the track TL on which the object OJ is arranged in time with arrival of the object OJ at the reference line KL. Further, when the large object DJ arrives at the reference line KL, the player is required to execute an operation of pushing the small button 13S positioned below the large button 13D corresponding to the two tracks TL which the large object DJ straddles. A difference between an operation timing of the player and a timing when the object OJ or the large object DJ arrives at the reference line KL is evaluated.

Figure 9:
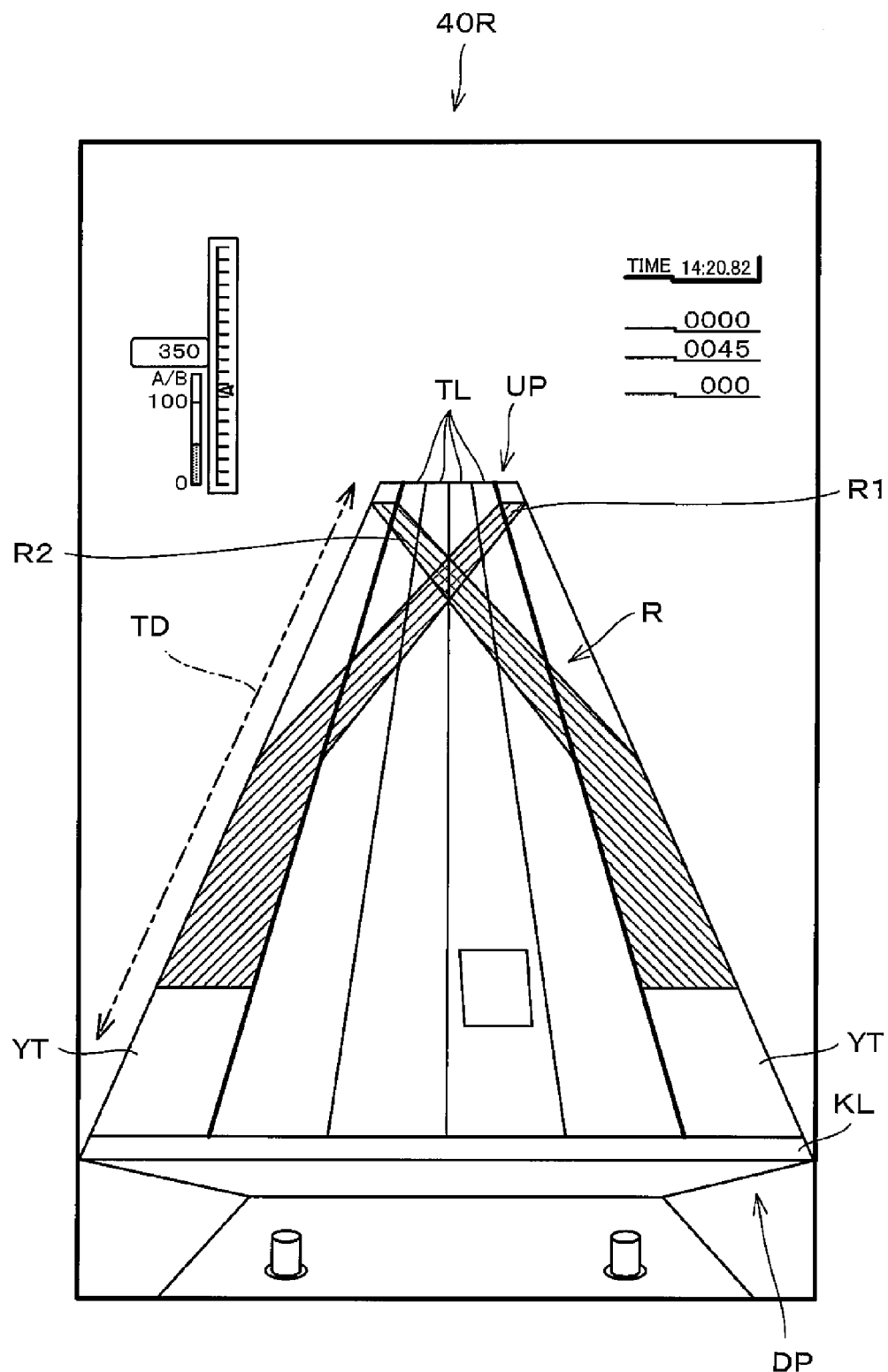
FIG. 9 is a diagram illustrating another example of a game screen.

An instruction path R is displayed on the game screen 40 at an appropriate timing. FIG. 9 is a diagram illustrating another example of a game screen. As illustrated in FIG. 9, a game screen 40R includes two instruction paths R. The two instruction paths R are arranged on the back side UP of the screen such that the two instruction paths R cross each other so as to draw a letter such as X. Specifically, one instruction path R1 extends from the spare track YT at the right side toward the spare track YT at the left side while obliquely crossing the four tracks TL, and the other instruction path R2 extends from the spare track YT at the left side toward the spare track YT at the right side while obliquely crossing the four tracks TL. And, the right instruction path R1 corresponds to the right volume controller 9B, and the left instruction path R2 corresponds to the left volume controller 9A.

Figure 10:
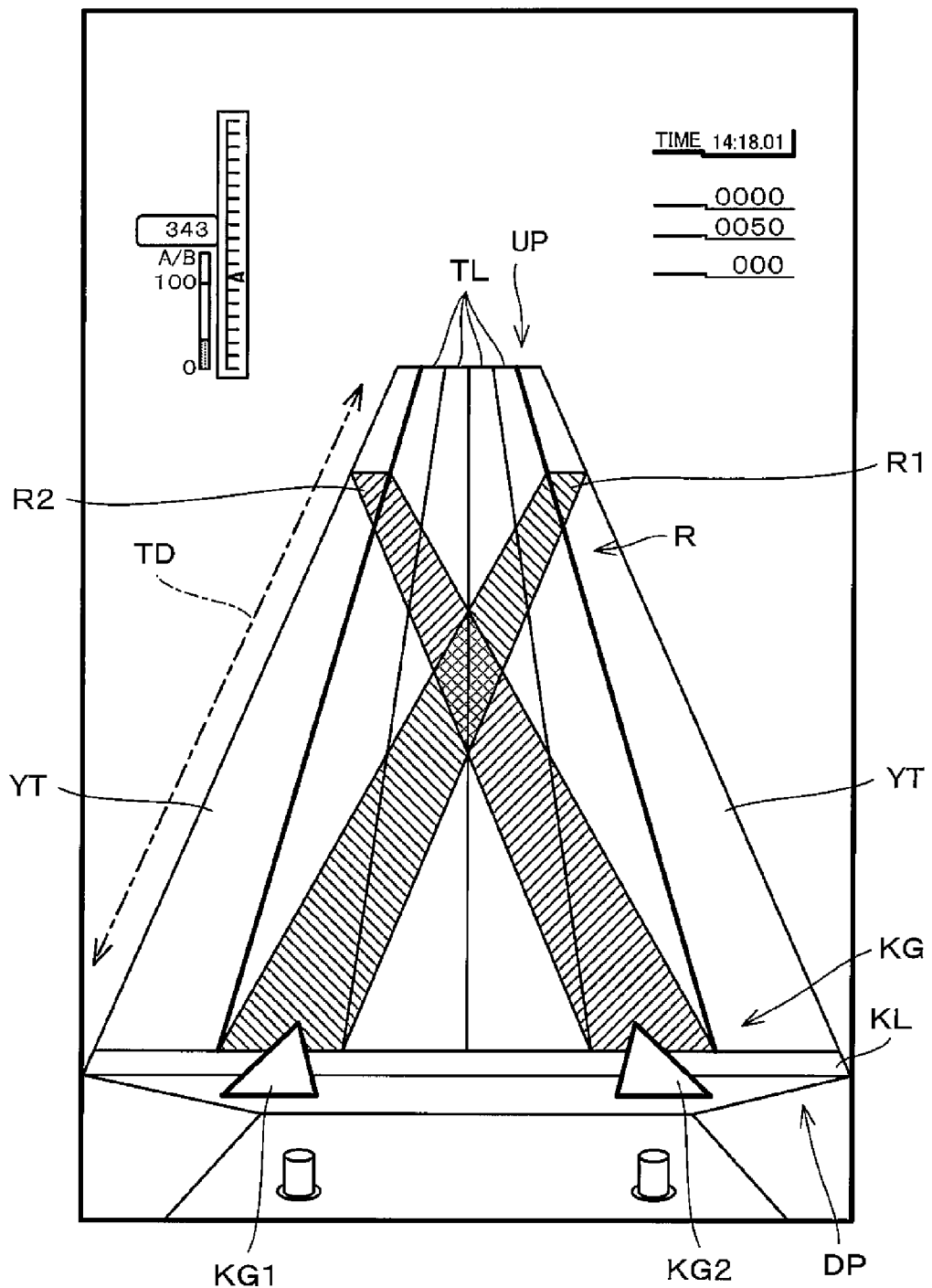
FIG. 10 is a diagram illustrating a game screen after a predetermined time elapses from the game screen of FIG. 9.

The instruction path R moves toward the reference line KL as a time passes. FIG. 10 is a diagram illustrating a game screen after a predetermined time elapses from the game screen 40R illustrated in FIG. 9. As illustrated in FIG. 10, two cursors KG, which serve as an operation corresponding mark, respectively corresponding to the two instruction paths R are displayed on the reference line KL in time with arrival of the instruction path R at the reference line KL. The cursor KG moves on the reference line KL in the left-right direction in response to the rotational operation on the volume controller 9. Specifically, the right cursor KG1 displayed corresponding to the right instruction path R1 moves in response to the rotational operation of the right volume controller 9B, and the left cursor KG2 displayed corresponding to the left instruction path R2 moves in response to the rotational operation of the left volume controller 9A.

The player is required to perform an operation not to lead each cursor KG astray outside each corresponding instruction path R. In other words, the player is required to perform rotating operation not to lead the right cursor KG1 astray outside the right instruction path R1 and not to lead the left cursor KG2 astray outside the left instruction path R2. When the cursor KG is led astray outside the instruction path R, a penalty is given. In contrast, when the cursor KG is not led astray outside the instruction path R until the instruction path R passes through the reference line KL, a privilege is given. Note that, for example, subtraction of a predetermined gauge in which a game ends when a value becomes zero or subtraction of an acquired score may be used as a penalty. Further, only a privilege may be given, and a penalty may not be given. For example, addition of a score or addition of a predetermined gauge may be used as a privilege.

Figure 11:
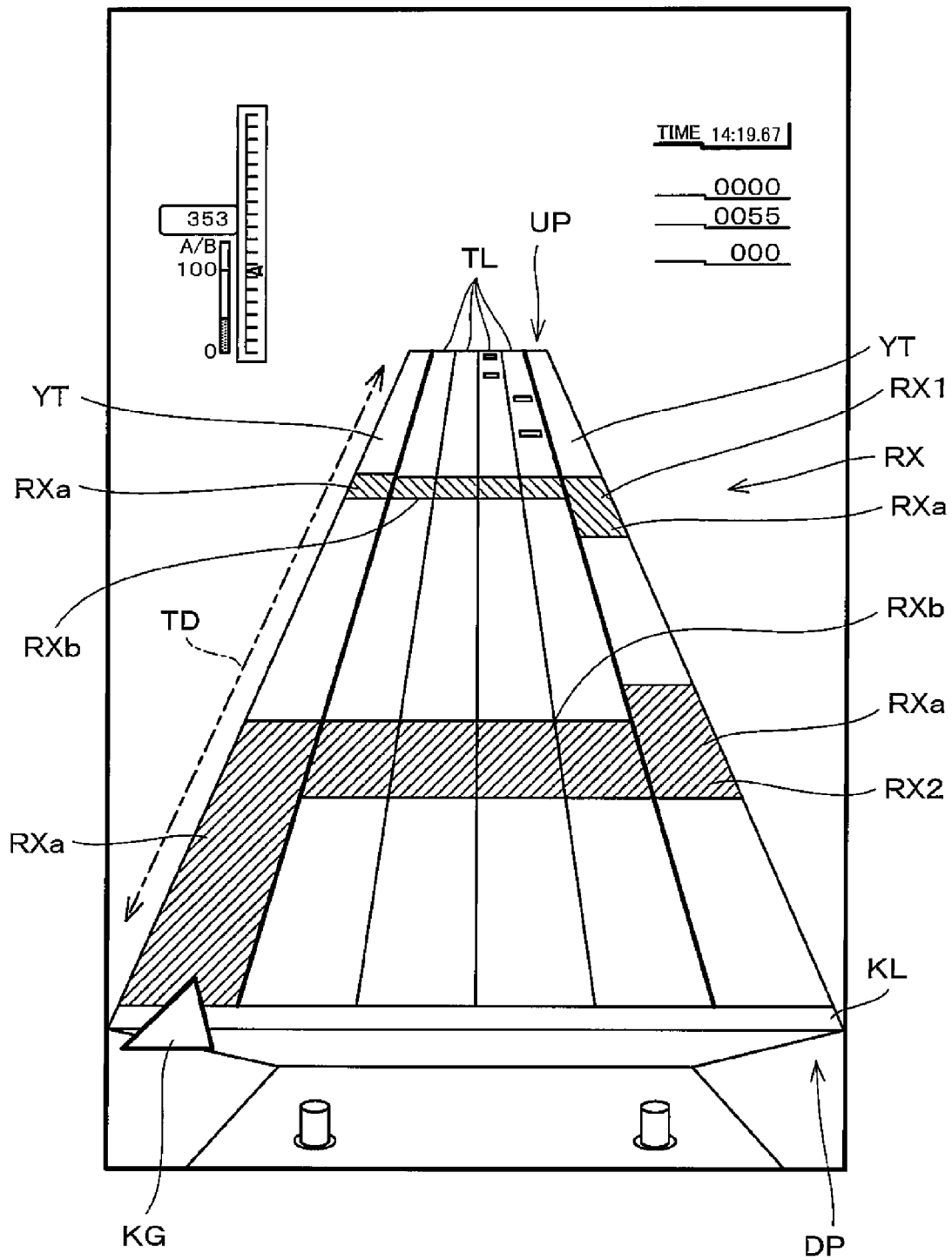
FIG. 11 is a diagram illustrating another example of an instruction path.

FIG. 11 is a diagram illustrating another example of the instruction path R. As illustrated in FIG. 11, an instruction path RX extending so as to be perpendicular to the four tracks TL may be displayed. The instruction path RX includes a straight-ahead portion RXa extending along the spare track YT and an orthogonal portion RXb extending in a direction orthogonal to the track TL. In the example of FIG. 11, two instruction paths RX are displayed. An instruction path RX1 arranged at the rear side is arranged such that the orthogonal portion RXb is interposed between the straight-ahead portion RXa extending along the spare track YT at the left side and the straight-ahead portion RXa extending along the spare track YT at the right side in a direction from the back side UP toward the front side DP.

Meanwhile, the instruction path RX2 arranged at the front side is arranged such that the orthogonal portion RXb is interposed between the straight-ahead portion RXa extending along the spare track YT at the right side and the straight-ahead portion RXa extending along the spare track YT at the left side in a direction from the back side UP toward the front side DP. In this case, the straight-ahead portion RXa which is positioned at the back side with the orthogonal portion RXb and extends along the spare track YT at the right side, corresponds to the right volume controller 9B. Meanwhile, the straight-ahead portion RXa which is positioned at the back side with the orthogonal portion RXb and extends along the spare track YT at the left side, corresponds to the left volume controller 9A. In other words, the instruction path RX1 arranged at the back side corresponds to the left volume controller 9A, and the instruction path RX2 arranged at the front side corresponds to the right volume controller 9B. Note that, the instruction paths R may be displayed to be distinguished from each other such as a from that the instruction paths R corresponding to the volume controllers 9A and 9B have different colors from each other.

Elements (including functions) of giving a change to a song which is being reproduced are allocated to the volume controllers 9A and 9B, respectively. For example, a guitar sound and a vocal sound are allocated to the left volume controller 9A of the A area 3A and the right volume controller 9B, respectively, as the elements for giving a change to a song. And, the volumes of the guitar sound and the vocal sound change in response to rotational operation on the volume controllers 9A and 9B, respectively.

Note that, for example, an effector function may be allocated to the volume controller 9. Specifically, an effect level on a song may change in response to the rotational operation on the volume controller 9. As such an effect, for example, a change of enhancing a sound of a specific frequency band on an original sound source of a song may be actualized. In this case, a frequency band to be enhanced may increase or decrease in response to the rotational operation on the volume controller 9.

Alternatively, a scratch function, that is, a function of increasing or decreasing a reproduction speed of a song may be allocated to the volume controller 9. Specifically, a scratch effect corresponding to an increment in the reproduction speed and a scratch effect corresponding to a decrement in the reproduction speed may be caused in a song in response to the rotational operation on the volume controller 9. Further, a predetermined sound effect may be allocated to the button 13. In other words, as the button 13 is pushed down, a predetermined sound effect may be added to the middle of a song.

Figure 12:
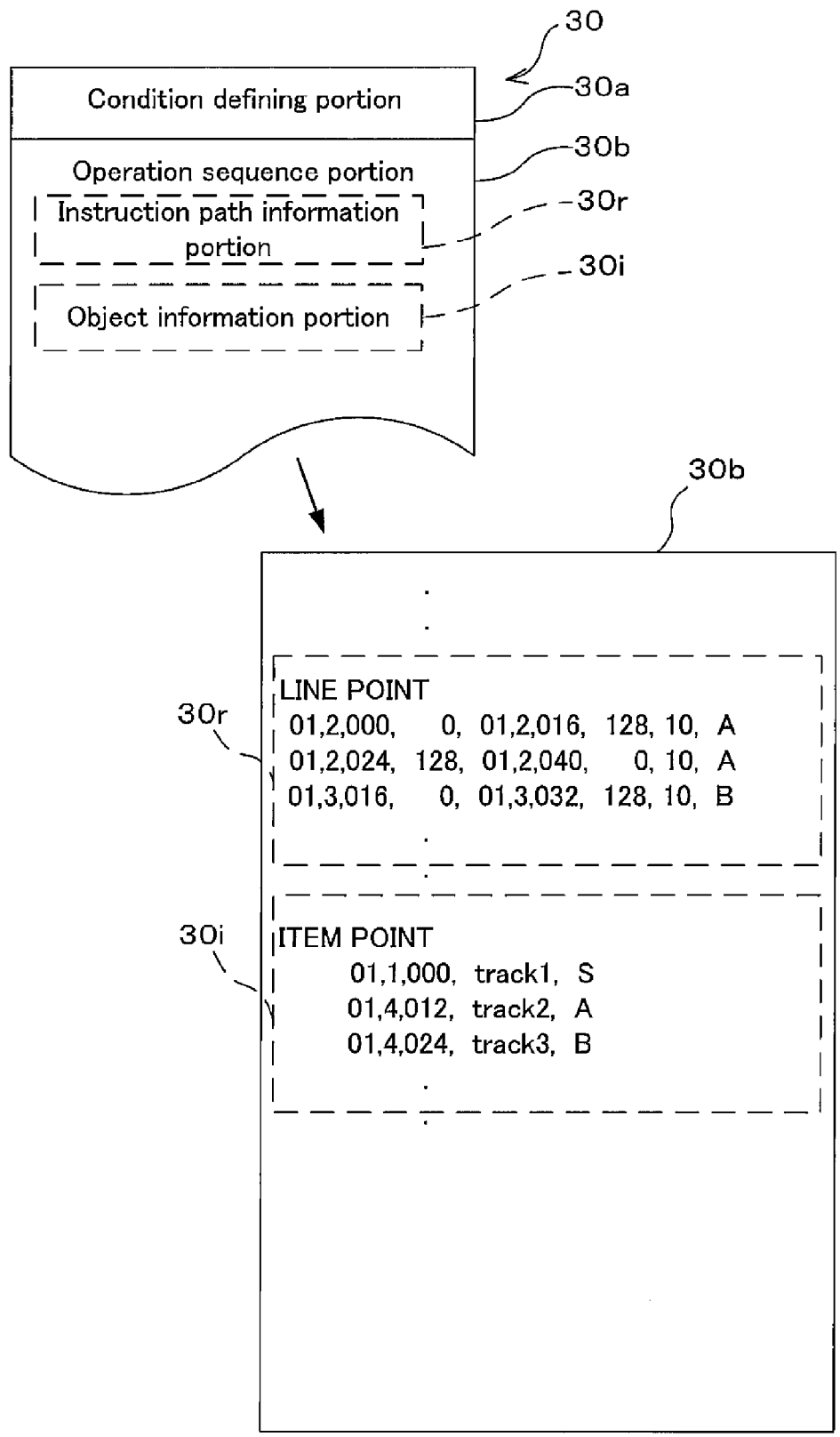
FIG. 12 is a diagram illustrating an example of content of sequence data.

Next, the details of the sequence data 30 will be described with reference to FIG. 12. FIG. 12 is a diagram illustrating an example of content of the sequence data 30. As illustrated in FIG. 12, the sequence data 30 includes a condition defining portion 30a and an operation sequence portion 30b. Information designating various conditions to execute a game such as the tempo of music, beat, a track, and the length of a song is described in the condition defining portion 30a.

Meanwhile, an instruction of an operation on the button 13 and the volume controller 9 is described in the operation sequence portion 30b in association with a time in a song. As illustrated in FIG. 12, the operation sequence portion 30b includes an instruction path information portion 30r used to form the instruction path R, and an object information portion 30i used to arrange the object OJ or the large object DJ on the track TL.

The instruction path information portion 30r includes information of a timing (reference timing) in a song, information of the position on the reference line KL extending in the left-right direction (the second direction) crossing the time axis direction (the depth direction TD) serving as information of the reference position, information of the width of the instruction path R, and information of an instruction path pattern. The instruction path information portion 30r is configured as a set of a plurality of records in which these pieces of information are associated with each other. In the example of FIG. 12, as information, information of a timing in a song at which the instruction path R starts, that is, information of a start timing, information of the position on the reference line KL at the start timing of the instruction path R, information of a timing in a song at which the instruction path R ends, that is, information of an end timing, information of the position on the reference line KL at the end timing of the instruction path R, information of the width of the instruction path R, and information of an instruction path pattern are described from the left in the described order. Further, "LINE POINT" is described at the beginning of the instruction path information portion 30r. The instruction path information portion 30r is distinguished from other information portions such as the object information portion 30i through this description.

Information of the reference timing such as the start timing and the end timing is described such that a bar number in a song, beats, and a value representing a time in a beat are separated by a comma. A time in a beat refers to an elapsed time from the head of one beat, and is represented by the number of units from the head obtained by equally dividing the length of one beat into n unit times. For example, when a time in which n is 100, and a time in which ¼ has elapsed from the head of a second beat in a second beat of a first bar of a song is designated as the reference timing, "01,2,025" is described.

Information of the position on the reference line KL is described using a numerical value representing each position in the left-right direction in which the reference line KL extends. For example, a number (a number of a unit length) when the length of the reference line KL in the left-right direction is equally divided by a predetermined number and positions respectively corresponding to the divided unit lengths are numbered in order from the left end, is used as a numerical value representing each position. In the example of FIG. 12, 128 is used as the predetermined number. Further, positions are numbered in order up to 128 at the position of the right end, like 0, 1, and 2, from the position of the left end of the reference line KL to the position of the right end thereof. In other words, when the position of the left end of the reference line KL is designated, a numerical value of 0 is described, and when the position of the right end is designated, a numerical value of 128 is described. Note that, information of the reference line KL means that when the reference timing corresponding to the information comes, the instruction path R is arranged at the position on the reference line KL, which is designated by the numerical value. In other words, information of the reference line KL means the position of a portion overlapping the instruction path R on the reference line KL. Further, before the reference timing comes, information of the position on the reference line KL functions as a designation of each position on the track TL which corresponds to the position on the reference line KL in the left-right direction, or the spare track YT in the left-right direction.

Information of the position on the reference line KL functions as information designating the volume controller 9. Specifically, when the position on the reference line KL associated with the end timing corresponds to the position of the right end, it functions as information designating the right volume controller 9B, whereas when the position on the reference line KL associated with the end timing corresponds to the position of the left end, it functions as information designating the left volume controller 9A. Note that, the left and right volume controllers 9A and 9B are designated using a description of the beginning of the instruction path information portion 30r. For example, when a description of the beginning is "LINE POINT1," it may function as the instruction path information portion 30r corresponding to the left volume controller 9A, whereas when a description of the beginning is "LINE POINT2," it may function as the instruction path information portion 30r corresponding to the right volume controller 9B.

The width of the instruction path R is designated using the unit length representing each position on the reference line KL. For example, when the width of the instruction path R is described as "10," the width of the length corresponding to 10 unit lengths is designated. The instruction path pattern is designated using an alphabet associated with each instruction path pattern. For example, "A" is associated with a pattern of an X type corresponding to the example of FIG. 9, and "B" is associated with a pattern having an orthogonal portion Rxb corresponding to the example of FIG. 11. And, when the pattern of the X type corresponding to the example of FIG. 9 is designated, "A" is described as the instruction path pattern. Note that, a correspondence between the instruction path pattern and an alphabet is actualized by a separate table (not illustrated).

In the example of FIG. 12, a start point in time ("000") of a second beat of a first bar is designated as the start timing, and a time in which "016" elapses from the start point in time of the second beat of the first bar is designated as the end timing. The position ("0") of the left end of the reference line KL is designated as the position of the start timing, and the position ("128") of the right end of the reference line KL is designated as the position of the end timing. Further, "10" is designated as the width of the instruction path R, and "A", that is, the X type is designated as the pattern. Thus, the instruction path R in which a letter X is drawn with the width of "10" is displayed such that it starts to reach the position of the left end of the reference line KL at the start point in time ("000") of the second beat of the first bar, and it ends at the position of the right end at a timing in which "016" has elapsed from the start point in time of the second beat of the first bar.

Meanwhile, the object information portion 30i includes information of a timing in a song, track information designating any one of the four tracks TL, and object information designating the type of object. The object information portion 30i is configured as a set of a plurality of records in which these pieces of information are associated with each other. In the example of FIG. 12, the information of a timing in a song, the track information, and the object information are described from the left in the described order. Further, "ITEM POINT" is described at the beginning of the object information portion 30$i$, and the object information portion 30$i$ is distinguished from other information portions such as the instruction path information portion 30$r$ through this description.

The information of a timing in a song is described similarly to the instruction path information portion 30$r$. The track information is described using information designating the four tracks TL. For example, the tracks are numbered as 1, 2, 3, and 4 in order starting from the track TL of the left end. When the track TL of the left end is designated, information of "track 1" is described, and when the track TL adjacent thereto is designated, information of "track 2" is described. The object information is described using an alphabet associated with the object OJ or the large object DJ. For example, "S" is associated with the object OJ. Further, depending on the position of the track TL to appear, the large object DJ is associated with "A" when the large object DJ straddles the two tracks TL at the left side and "B" when the large object DJ straddles the two tracks TL at the right side. Note that, the type of large object DJ is associated with any other alphabet, depending on the length thereof or the like.

In the example of FIG. 12, an instruction is described to display the object OJ ("S") that moves on the track TL ("track 1") of the left end to arrive at the reference line KL at the start point in time ("000") of the first beat of the first bar. Meanwhile, an instruction is described to display the large object DJ that straddles the two tracks TL of the left side and moves to arrive at the reference line KL at a timing in which "0012" has elapsed from the start point in time of the first beat of the first bar.

Based on the sequence data 30, the game control unit 16 executes a process of displaying the instruction path R and a process of displaying the object OJ or the large object DJ. The game control unit 16 controls a display of the instruction path R, the object OJ, and the large object DJ so that the instruction path R, the object OJ, and the large object DJ can match the reference line KL at the reference timing designated by the sequence data 30.

Next, a process of executing a music game through the game control unit 16 will be described. The game control unit 16 reads the game program 21 and performs initial setting necessary to execute a music game, and then is on standby for a game start instruction from the player. For example, the game start instruction includes an operation specifying data used in a game such as selection of a song to be played in a game or a difficulty level. A procedure receiving this instruction is the same as in a well-known music game.

When a game start is instructed, the game control unit 16 reads the song data 27 corresponding to a song selected by the player and outputs the read song data 27 to the audio output control unit 18, so that the song starts to be reproduced from the speaker 4. Through this operation, the control unit 15 functions as a song reproducing device.

Furthermore, the game control unit 16 reads the sequence data 30 corresponding to the player's selection in synchronization with reproduction of a song, generates image data necessary for rendering a game screen with reference to the image data 29, and outputs the generated image data to the display control unit 17. Through this operation, the game control unit 16 causes the game screen to be displayed on the monitor 2. Further, as processes necessary to display the game screen or the like during execution of the music game, the game control unit 16 repeatedly executes an instruction path display process routine illustrated in FIG. 13, a cursor display process routine illustrated in FIG. 14, a cursor position control process routine illustrated in FIG. 15, and an operation evaluation routine illustrated in FIG. 16 at a predetermined period. Note that, the sequence processing unit 25 handles the routine of FIG. 13, the routine of FIG. 14, and the routine of FIG. 15, and the operation evaluating unit 26 handles the routine of FIG. 16. Besides, the game control unit 16 executes a process of controlling a display of the object OJ or the large object DJ in addition to above processes, but this process may be actualized by a well-known process, and so the details of these processes will not be described.

Figure 13:
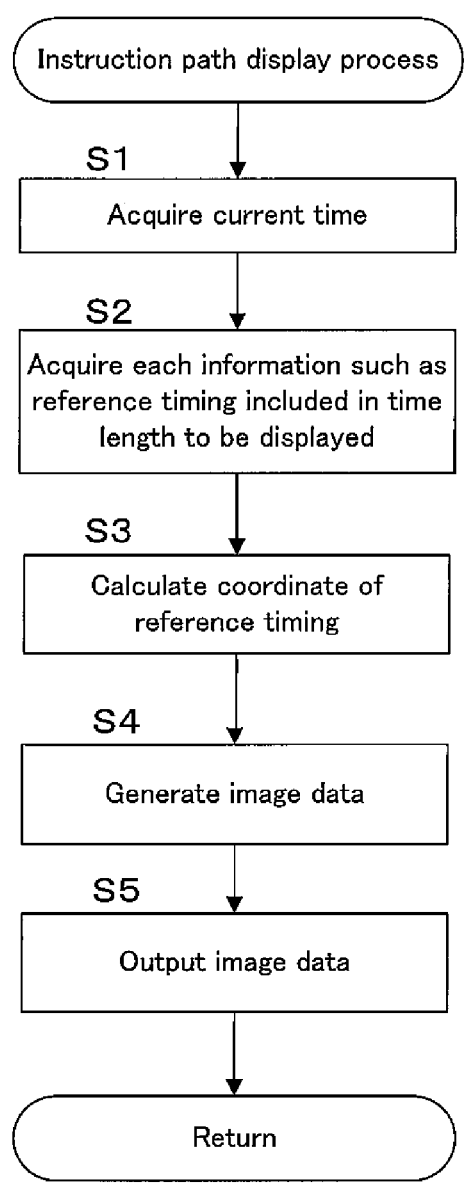
FIG. 13 is a diagram illustrating an example of a flowchart of an instruction path display process routine.

When the instruction path display process routine of FIG. 13 starts, in step S1, the sequence processing unit 25 of the game control unit 16 first acquires a current time on a song. For example, clocking starts by an internal clock of the game control unit 16 from a reproduction start point in time of a song, and the current time is acquired based on a value of the internal clock. Subsequently, in step S2, the sequence processing unit 25 acquires each information such as a reference timing (a start timing and an end timing), the position on the reference line KL, the width, and a pattern of the instruction path information portion 30$r$ included in a time length (a predetermined time range) to be displayed on a game screen included in the instruction path information portion 30$r$ from the sequence data 30. For example, the predetermined time range is set to a time length of about two bars of a song from the current time.

Next, in step S3, the sequence processing unit 25 calculates coordinates, on the game screen, corresponding to each reference timing (each of the start timing and the end timing) included within the display range acquired in step S2. For example, this calculation is performed as follows. First, the sequence processing unit 25 determines whether or not the instruction path R included in the display range is associated with any one of the volume controllers 9. This determination is performed based on the position on the reference line KL designated as the end timing of the instruction path R. For example, it is determined that the instruction path R is associated with the right volume controller 9B when the position of the right end on the reference line KL is designated as the end timing, whereas it is determined that the instruction path R is associated with the left volume controller 9A when the position of the left end on the reference line KL is designated as the end timing. Next, the position of each reference timing in the time axis direction (that is, the depth direction TD) from the position of the reference line KL is determined based on a temporal difference between each reference timing and the current time. Furthermore, the position in the left-right direction at each reference timing is determined based on information of the position on the reference line KL associated with each reference timing or the like. Thus, it is possible to acquire coordinates of each designated position in the left-right direction corresponding to each reference timing designated by an arrangement of a time order along a time axis from the position of the reference line KL.

When a calculation of coordinates corresponding to each reference timing is completed, the sequence processing unit 25 causes the process to proceed to step S4. In step S4, the sequence processing unit 25 generates image data necessary to render the instruction path R based on the coordinates of the reference timing calculated in step S3 and each information acquired in step S2. This image data is generated as follows as an example. First, image data of the instruction path R is generated based on the coordinates of each reference timing (the start timing and the end timing), information of the width of the instruction path R, and information of the instruction path pattern, which are included in the instruction path information portion 30*r*. Specifically, the coordinates of the start timing is connected to the coordinates of the end timing according to the instruction path pattern so that the instruction path R can have a designated width. Thus, generated is image data of the instruction path R extending in the time axis direction according to the designated instruction path pattern while passing through the designated position in the left-right direction in the time order of each reference timing, that is, in the order of the start timing and the end timing.

Subsequently, in step S5, the sequence processing unit 25 outputs the image data generated in step S4 to the display control unit 17, and ends the current routine. The above process is repeatedly executed, and so the instruction path R extending in the depth direction TD while passing through a predetermined position in the left-right direction at the reference timing described in the sequence data 30 is displayed on the game screen. Further, the instruction path R is moved in the depth direction TD and displayed so that the position corresponding to each reference timing of the instruction path R can match the position of the reference line KL at the current time.

Figure 14:
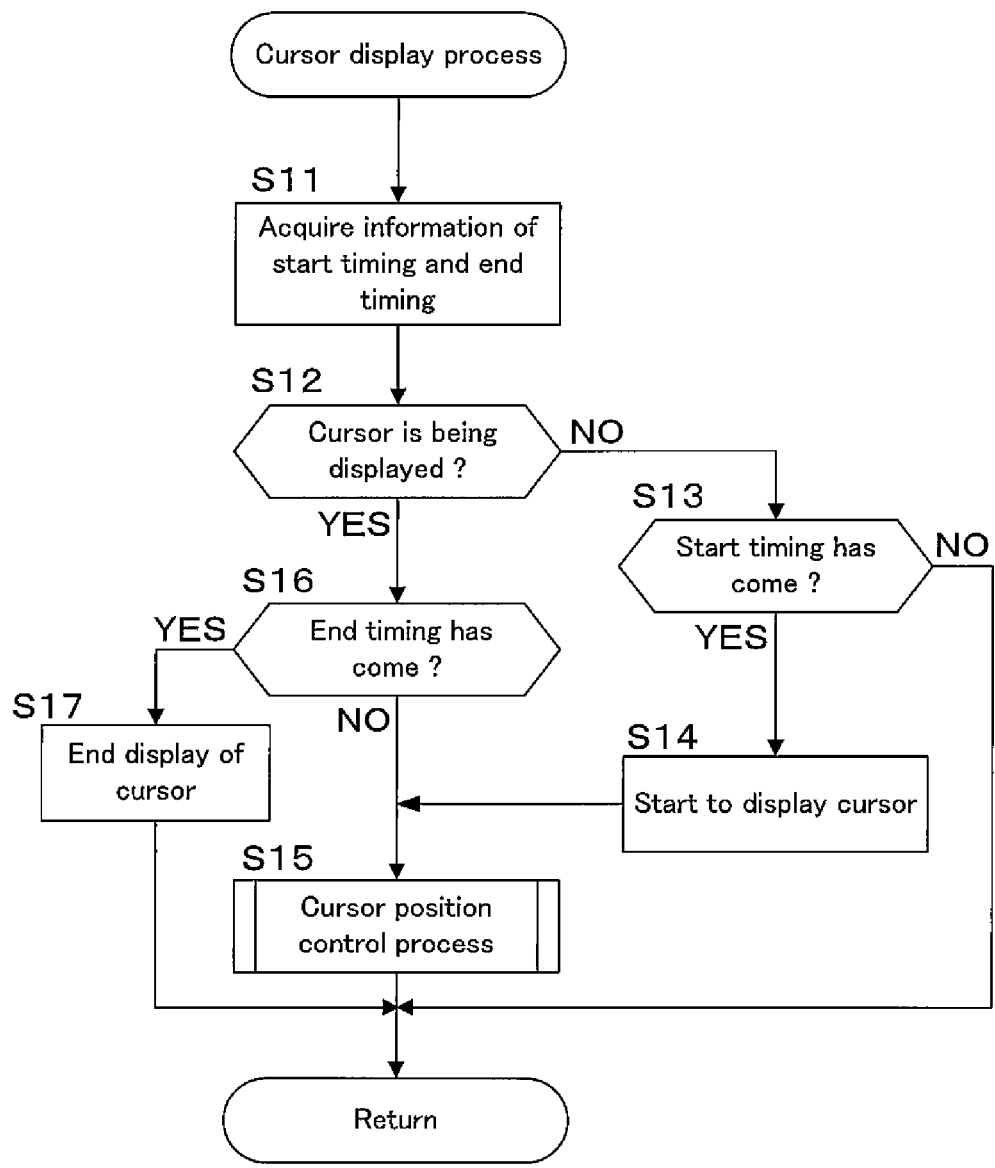
FIG. 14 is a diagram illustrating an example of a flowchart of a cursor display process routine.

Next, a cursor display process routine of FIG. 14 will be described. The routine of FIG. 14 is a process of controlling a display of the cursor KG on the reference line KL. When the routine of FIG. 14 starts, the sequence processing unit 25 acquires information of the start timing and the end timing of the instruction path R included in the display range from the instruction path information portion 30*r* of the sequence data 30. Subsequently, in step S12, the sequence processing unit 25 determines whether or not the cursor KG is being displayed on the game screen, that is, determines the presence or absence of a display of the cursor KG.

When a determination result of step S12 is a negative result, that is, when it is determined that the cursor KG is not displayed on the game screen, the sequence processing unit 25 causes the process to proceed to step S13. In step S13, the sequence processing unit 25 determines whether or not the current time is the start timing based on the information acquired in step S11, that is, determines whether or not the start timing of the instruction path R has come. When a determination result is negative, that is, when the start timing has not come, subsequent processes are skipped, and the current routine ends.

In contrast, when the determination result of step S13 is positive, that is, when the start timing has come, the sequence processing unit 25 causes the process to proceed to step S14. In step S14, the sequence processing unit 25 starts to display the cursor KG at a predetermined position, and then causes the process to proceed to step S15. Further, a portion overlapping the instruction path R on the reference line KL is used as the predetermined position. In step S15, the sequence processing unit executes a sub routine of a cursor position control process. The details of the sub routine will be described below. When the process of step S15 ends, the sequence processing unit 25 ends the current routine.

Meanwhile, when the determination result of step S12 is positive, that is, when it is determined that the cursor KG is being displayed on the game screen, the sequence processing unit 25 causes the process to proceed to step S16. In step S16, the sequence processing unit 25 determines whether or not the current time is the end timing based on the information acquired in step S11, that is, determines whether or not the end timing of the instruction path R has come. When this determination result is negative, that is, when the end timing has not come, the sequence processing unit 25 causes the process to proceed to step S15.

In step S15, the sequence processing unit 25 executes the sub routine of the cursor position control process, and then ends the current routine. In contrast, when the determination result of step S16 is positive, that is, when the end timing has come, the sequence processing unit 25 causes the process to proceed to step S17. In step S17, the sequence processing unit 25 erases a display of the cursor KG from the game screen, that is, ends a display of the cursor KG, and then ends the current routine.

Figure 15:
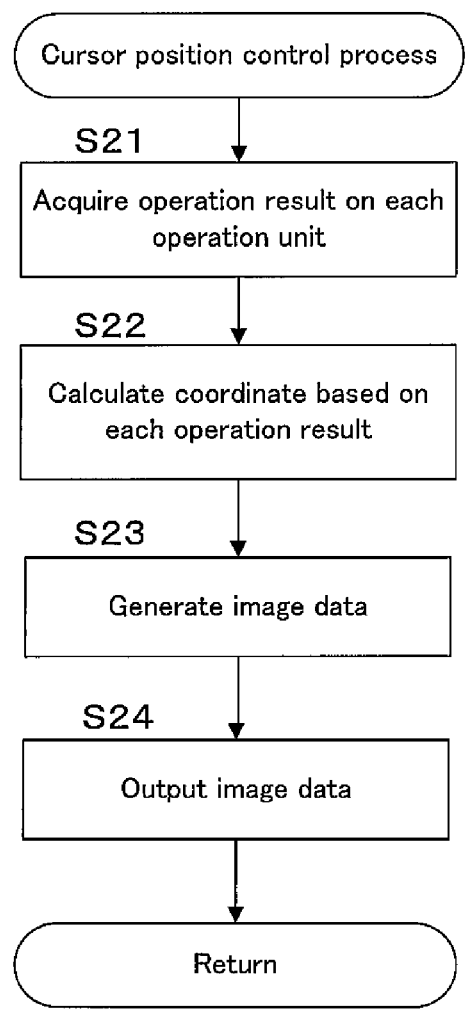
FIG. 15 is a diagram illustrating an example of a flowchart of a cursor position control process routine.

FIG. 15 is a diagram illustrating an example of a flowchart of the cursor position control process routine. This routine is a sub routine of the routine of FIG. 14, and is called in step S15 of the routine of FIG. 14 and then executed. When the routine of FIG. 15 starts, in step S21, the sequence processing unit 25 first acquires the player's operation result on the volume controller 9. Specifically, the rotating direction and the rotation amount of each volume controller 9 are acquired with reference to an output signal of the detecting device 35 as the player's operation result.

Subsequently, in step S22, the sequence processing unit 25 calculates coordinates of the cursor KG to be displayed as a movement destination based on each operation result acquired in step S21. For example, the coordinates are calculated as follows. First, the sequence processing unit 25 determines a direction to move the cursor KG based on the acquired rotating direction. Specifically, a right direction is determined as a direction to move when a clockwise rotation operation is performed on the volume controller 9, whereas a left direction is determined as a direction to move when a counterclockwise rotation operation is performed on the volume controller 9. Next, a movement amount is determined based on the rotation amount. This determination is made such that a determination range is set to a part of a range (for example, 360°) in which the volume controller 9 is rotatable. Specifically, first, an angle set as the determination range is equally divided by a predetermined number (a number in common with information of the position of the reference line KL), so that a unit angle is calculated. Next, the rotation amount, that is, the rotation angle is replaced with a quantity of a unit angle. Then, a unit length corresponding to this quantity is calculated as the movement amount. The coordinates of the cursor KG to be displayed as a movement destination are calculated based on the moving direction and the movement amount (the moving distance) which are calculated in the above-described way, and the current coordinates of the cursor KG (a predetermined position when a display starts).

Next, in step S23, the sequence processing unit 25 generates image data necessary to render the cursor KG based on the coordinates calculated in step S22. Specifically, image data is generated so that the cursor KG is displayed at the coordinates of the movement destination calculated in step S22. Subsequently, in step S24, the sequence processing unit 25 outputs the image data to the display control unit 17, and then ends the current routine. As the above process is executed, the cursor KG is displayed on the reference line KL, and the cursor KG moves on the reference line KL in response to an operation on the volume controller 9.

Figure 16:
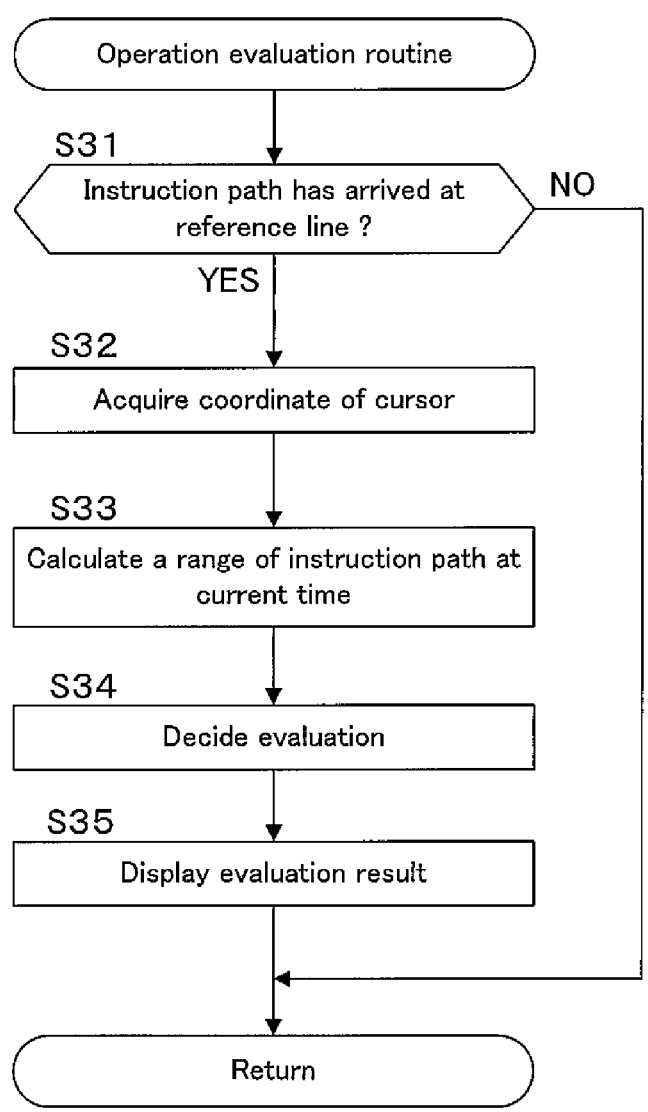
FIG. 16 is a diagram illustrating an example of a flowchart of an operation evaluation routine.

Next, an operation evaluation routine of FIG. 16 will be described. The routine of FIG. 16 is a process of evaluating the player's operation on the volume controller 9. Further, the routine of FIG. 16 is executed for each instruction path R, that is, for each volume controller 9. When the routine of FIG. 16 starts, in step S31, the operation evaluating unit 26 first determines whether or not the instruction path R has arrived at the reference line KL. For example, this determination is actualized by comparing the current time with the start timing and the end timing of the instruction path R. Specifically, when the current time is a time between the start timing and the end timing, it is determined that the instruction path R has arrived at the reference line KL, and otherwise, it is determined that the instruction path R has not arrived at the reference line KL. Then, when this determination result is negative, subsequent processes are skipped, and then the current routine ends.

In contrast, when the determination result of step S31 is positive, that is, when the instruction path R has arrived at the reference line KL, the operation evaluating unit 26 causes the process to proceed to step S32. In step S32, the operation evaluating unit 26 acquires coordinates of the cursor KG on the reference line KL. This coordinates may be acquired using the processing result of FIG. 15 or may be acquired similarly to step S22 of FIG. 15.

Subsequently, in step S33, the operation evaluating unit 26 specifies a range of the instruction path R on the reference line KL, which corresponding to the current time. For example, this specification is performed as follows. First, a time elapsed from the start timing is calculated by comparing the start timing of the instruction path R with the current time. Next, coordinates of the left end of the instruction path R and coordinates of the right end thereof on the reference line KL at the elapsed time are calculated based on information of the width of the instruction path R and information of a connection pattern. By calculating the coordinates of both ends of the instruction path R on the reference line KL in this way, a range of the instruction path R on the reference line KL, that is, an overlapping range in which the reference line KL overlaps the instruction path R is specified.

Next, in step S34, the operation evaluating unit 26 decides evaluation. For example, this decision is performed as follows. First, the operation evaluating unit 26 determines whether or not the coordinates of the cursor KG acquired in step S32 are included in the overlapping range, specified in step S33, in which the reference line KL overlaps the instruction path R. When the coordinates of the cursor KG are included in the overlapping range, the operation evaluating unit 26 decides to give a privilege (or excuse a penalty) as an evaluation result. In contrast, the coordinates of the cursor KG are not included in the overlapping range, that is, when the position of the cursor KG is outside the instruction path R, the operation evaluating unit 26 decides to give a penalty (or not to give a privilege) as an evaluation result. In this way, the operation evaluating unit 26 decides evaluation in step S34.

Subsequently, in step S35, the operation evaluating unit 26 controls an output to the display control unit 17 such that the evaluation result of step S34 is reflected in a display of the game screen. Specifically, for example, addition of a score or addition of a gauge is reflected in a display of the game screen in response to the evaluation result decided to give a privilege. In contrast, reduction of a gauge is reflected in a display of the game screen in response to the evaluation result decided to give a penalty. When the process of step S35 ends, the operation evaluating unit 26 ends the current routine.

As described above, according to this embodiment, the instruction path R whose direction variously changes so as to cross the tracks TL is displayed based on the sequence data 30. The instruction path R moves to the reference line KL as a time elapses. Further, the cursor KG is displayed on the reference line KL in time with arrival of the instruction path R at the reference line KL. The position of the cursor KG on the reference line KL, that is, the position of the cursor KG in the left-right direction changes according to an operation on the volume controller 9. For this reason, when an appropriate operation is not performed on the volume controller 9, the instruction path R and the cursor KG differ from each other in the position in the left-right direction. Thus, it is possible to request the player to perform an appropriate operation on the volume controller 9 so that the cursor KG moves according to a change in the instruction path R. In other words, it is possible to teach a plurality of pieces of information on a concrete operation or the like on the volume controller 9 such as the rotation amount and the rotating direction to the player using the change direction and the amount of change of the instruction path R, and it is possible to request the player to perform the concrete operation.

Furthermore, the volume controller 9 is allocated elements used to give a change to a song. For this reason, various kinds of changes can be made in a song which is being played by an operation on the volume controller 9 for moving the cursor KG. Since an appropriate timing, an appropriate amount, and the like are taught using the change in the instruction path R, it is possible to cause a song to appropriately change. As a result, an exhilarating feeling by which a song is effectively changed can be provided. In other words, new amusement can be provided by addition of game elements changing an element of a song.

In the above embodiment, the control unit 15 functions as an operation teach device, a reference timing determining device, and a mark control device by causing the sequence processing unit 25 to execute the routines of FIGS. 13 to 15. Furthermore, the control unit 15 functions as an evaluating unit by causing the operation evaluating unit 26 to execute the routine of FIG. 16.

The present invention is not limited to the above embodiments, and can be embodied in an appropriate embodiment. In the above embodiment, the reference timing and the reference position are taught through a display of the reference mark and the current reference mark, but the guidance embodiment is not limited to this example. For example, the reference timing and the reference position may be taught by a sound. Further, for example, the reference timing and the reference position may be taught such that information of the reference position is displayed at the center of an object through a numerical value or the like. In this case, the object functions as the reference mark for guiding the reference position. Furthermore, the present invention is not limited to the embodiment in which both the reference timing and the reference position are taught by one reference mark. For example, information of the reference timing may be taught by a mark such as an object, and information of the reference position may be displayed apart (separately) from a mark of an object corresponding to the reference position in association with the mark.

In the above embodiment, information of the position in a direction orthogonal to a time axis is described in the sequence data 30 as information of the reference position, but the information of the reference position is not limited to this example. Information of any position may be used as information of the reference position as long as the position is not arranged on the time axis, that is, when the position is in the direction crossing the time axis.

Further, the operating unit is not limited to the volume controller. For example, a distinguishing device such as a mark or a groove causing the outer circumferential portion of the volume controller to be distinguished from any other portion may be provided on the outer circumferential portion of the volume controller. In this case, information designating the position of a portion distinguished by the distinguishing device may be described in the reference timing data as information related to the reference position. In other words, an absolute displacement position at which the portion distinguished by the distinguishing device is positioned as well as a relative displacement position from the current position such as the change direction and the amount of change may be used as information related to the reference position. In this case, the portion distinguished by the distinguishing device functions as the reference portion. Further, all of the operating units may be configured to be movable. In this case, all of the operating units function as the reference portion. Furthermore, a change in the position of the reference potion is not limited to rotation movement. Various kinds of position changes such as in the vertical direction or the horizontal direction may be employed.

In the above embodiment, information related to the reference position is described in the reference timing data using the operation direction and the operation amount, but the reference timing data is not limited to this example. For example, information of a movement amount and a movement direction from an immediately previous position may be described as the information of the reference position. Alternatively, information of an absolute position designating the position of the portion distinguished by the distinguishing device may be described. For example, the information of the reference position may be described using a letter such as "a" or "b" or a symbol which is associated with a direction crossing a time axis.

In the above embodiment, as the reference mark moves toward the current time mark, relative displacement occurs therebetween, but the relative displacement is not limited to this example. For example, the current mark may move toward the reference mark. Further, in the above embodiment, the depth direction is used as the time axis direction, but the time axis direction is not limited to this example. For example, the horizontal direction, the vertical direction, or the like may be used. Furthermore, the time axis is not limited to a straight line. For example, a curved line may be used as the time axis. Thus, the time axis direction may also appropriately change, for example, along the time axis extending in the form of a curved line.

In the above embodiment, a music game is employed as a game executed by a game machine, but a game executed by a game machine is not limited to a music game. As long as the position of a reference portion is designated at a reference timing at which an operation is performed, various games such as a role-playing game or an action game may be executed by a game machine. Furthermore, the game system of the present invention may be actualized in an appropriate embodiment such as a game machine for business use installed in commercial facilities, a stationary game machine for home use, a portable game machine, or a game system actualized using a network.

What is claimed is:

1. A game machine comprising:
    a display apparatus that displays and outputs a game screen;
    an input apparatus that includes at least one operating unit operated so as to change a position of a reference portion;
    a reference timing data storage device adapted and configured to store reference timing data in which a reference timing at which the operating unit is operated during a game is associated with information related to a reference position at which the reference portion is to be positioned at the reference timing; and
    an operation teach device adapted and configured to teach a player about the reference timing and the information of the reference position based on the reference timing data, wherein the operation teach device includes:
    a reference timing determining device adapted and configured to determine the reference timing included within a predetermined time range from a current time on the game to a future and the information of the reference position corresponding to the reference timing based on the reference timing data; and
    a mark control device adapted and configured to cause a reference mark representing each reference timing and the information of the reference positions corresponding to each reference timing determined by the reference timing determining device, and a current time mark corresponding to the current time, to be displayed along a time axis on the game by an arrangement of a time order, and cause relative displacement along the time axis between the reference mark and the current time mark such that a distance in a time axis direction between the reference mark and the current time mark changes with a decrease in a time difference between the reference timing to be taught by the reference mark and the current time, wherein information related to a position in a second direction crossing a first direction going along the time axis direction is described in the reference timing data as the information related to the reference position, and
    the mark control device teaches information related to the position in the second direction by displaying the reference mark at the position in the second direction corresponding to the reference timing at the reference timing on the time axis based on the information related to the position in the second direction.

2. The game machine according to claim 1, wherein the mark control device causes the relative displacement along the time axis such that the reference mark moves toward the current time mark.

3. The game machine according to claim 1, wherein the mark control device further displays an operation corresponding mark in which the position in the second direction changes according to a change in the position of the reference portion while matching the current time mark in the first direction at the current time.

4. The game machine according to claim 1, wherein an orthogonal direction among directions crossing the first direction is used as the second direction.

5. The game machine according to claim 1, wherein the mark control device displays an instruction path extending from one end side of the time axis toward the other end side while passing through each position in the second direction corresponding to each reference timing in a time order of each reference timing determined by the reference timing determining device as the reference mark.

6. The game machine according to claim 5, wherein
    a plurality of operating units is provided in the input apparatus,
    the reference timing is described in the reference timing data further in association with information designating any one of the plurality of operating units, and
    the mark control device displays the instruction path corresponding to each of the plurality of operating units to be distinguishable for each operating unit.

7. The game machine according to claim 6, wherein the mark control device displays the instruction path corresponding to each of the plurality of operating units to be distinguishable for each operating unit by arranging at least one of the one end side and the other end side of the instruction path at a different position for each operating unit.

8. The game machine according to claim 6, wherein the mark control device displays the instruction path corresponding to each of the plurality of operating units to be distinguishable by causing a color of the instruction path to differ according to the operating unit.

9. The game machine according to claim 1, wherein information related to the change direction and the amount of change of the reference portion are described in the reference timing data as the information related to the reference position.

10. The game machine according to claim 1, wherein
a plurality of operating units is provided in the input apparatus,
the reference timing is described in the reference timing data further in association with information designating any one of the plurality of operating units, and
the operation teach device teaches the reference timing corresponding to each of the plurality of operating units and the information of the reference position to be distinguishable for each operating unit.

11. The game machine according to claim 1, wherein
the input apparatus is configured to detect an operation on the operating unit, and
the operation teach device comprises an evaluating unit adapted and configured to evaluate an operation on the operating unit based on the reference timing and the information of the reference position described in the reference timing data.

12. The game machine according to claim 1, further comprising:
an audio output apparatus that reproduces and outputs a sound;
a song data storage device adapted and configured to store song data to reproduce a song; and
a song reproducing device adapted and configured to reproduce the song through the audio output apparatus based on the song data, and wherein
a timing during reproduction of the song is described in the reference timing data as the reference timing.

13. The game machine according to claim 1, wherein
the input apparatus is provided with a rotational operating member that has a center line and is configured to rotate on the center line as the operating unit, wherein a position of an outer circumferential portion changes with the rotation, and
the outer circumferential portion of the rotational operating member is used as the reference portion.

14. The game machine according to claim 13, wherein
the rotational operating member is provided with a distinguishing device for distinguishing a portion of the outer circumferential portion from the remaining portion, and
the portion of the outer circumferential portion distinguished by the distinguishing device is used as the reference portion.

15. A non-transitory computer readable storage medium storing a computer program for a game machine comprising: a display apparatus that displays and outputs a game screen; an input apparatus that includes at least one operating unit operated so as to change a position of a reference portion; a reference timing data storage device adapted and configured to store reference timing data in which a reference timing at which the operating unit is operated during a game is associated with information related to a reference position at which the reference portion is to be positioned at the reference timing; and wherein the computer program is configured so as to cause a computer which is incorporated in the game machine to serve as:
an operation teach device adapted and configured to teach a player about the reference timing and the information of the reference position based on the reference timing data, wherein the operation teach device includes:
a reference timing determining device adapted and configured to determine the reference timing included within a predetermined time range from a current time on the game to a future and the information of the reference position corresponding to the reference timing based on the reference timing data; and
a mark control device adapted and configured to cause a reference mark representing each reference timing and the information of the reference positions corresponding to each reference timing determined by the reference timing determining device, and a current time mark corresponding to the current time, to be displayed along a time axis on the game by an arrangement of a time order, and cause relative displacement along the time axis between the reference mark and the current time mark such that a distance in a time axis direction between the reference mark and the current time mark changes with a decrease in a time difference between the reference timing to be taught by the reference mark and the current time, wherein information related to a position in a second direction crossing a first direction going along the time axis direction is described in the reference timing data as the information related to the reference position, and
the mark control device teaches information related to the position in the second direction by displaying the reference mark at the position in the second direction corresponding to the reference timing at the reference timing on the time axis based on the information related to the position in the second direction.

16. A control method of controlling a computer incorporated in a game machine comprising: a display apparatus that displays and outputs a game screen; an input apparatus that includes at least one operating unit operated so as to change a position of a reference portion; a reference timing data storage device adapted and configured to store reference timing data in which a reference timing at which the operating unit is operated during a game is associated with information related to a reference position at which the reference portion is to be positioned at the reference timing, and wherein
the control method of controlling the computer comprises an operation teach step that teaches a player about the reference timing and the information of the reference position based on the reference timing data, wherein the operation teach step includes:
determining the reference timing included within a predetermined time range from a current time on the game to a future and the information of the reference position corresponding to the reference timing based on the reference timing data; and
causing a reference mark representing each reference timing and the information of the reference positions corresponding to each reference timing determined by the reference timing determining device, displaying a current time mark corresponding to the current time along a time axis on the game by an arrangement of a time order, and causing relative displacement along the time axis between the reference mark and the current time mark such that a distance in a time axis direction between the reference mark and the current time mark changes with a decrease in a time difference between the reference timing to be taught by the reference mark and the current time, wherein information related to a position in a second direction crossing a first direction going along the time axis direction is described in the reference timing data as the information related to the reference position, and displaying the reference mark at the position in the second direction corresponding to the reference timing at the reference timing on the time axis based on the information related to the position in the second direction.

* * * * *